(12) United States Patent
Tanada et al.

(10) Patent No.: US 6,847,425 B2
(45) Date of Patent: Jan. 25, 2005

(54) LIQUID CRYSTAL DISPLAY HAVING REFLECTOR OUTSIDE LIQUID CRYSTAL CELL

(75) Inventors: Tetsushi Tanada, Fukushima-ken (JP); Mitsuo Ohizumi, Fukushima-ken (JP); Mitsuru Kano, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 9 days.

(21) Appl. No.: 10/193,701

(22) Filed: Jul. 10, 2002

(65) Prior Publication Data

US 2003/0038911 A1 Feb. 27, 2003

(30) Foreign Application Priority Data

Jul. 12, 2001 (JP) ........................................ 2001-212340
Jul. 27, 2001 (JP) ........................................ 2001-228657

(51) Int. Cl.[7] ............................................. G02F 1/1335
(52) U.S. Cl. ........................ 349/113; 349/99; 349/119; 349/180; 349/181
(58) Field of Search ................................. 349/113, 102, 349/119, 180, 181, 99, 103

(56) References Cited

U.S. PATENT DOCUMENTS 6,219,122 B1 * 4/2001 Uchida et al. .............. 349/117

FOREIGN PATENT DOCUMENTS

JP 4-212931 * 8/1992

* cited by examiner

*Primary Examiner*—Toan Ton
*Assistant Examiner*—Tai Duong
(74) *Attorney, Agent, or Firm*—Brinks Hofer Gilson & Lione

(57) ABSTRACT

A liquid crystal display includes a liquid crystal cell including a first transparent substrate and a second substrate, and a reflector attached to the outer surface of the first transparent substrate with a bonding layer therebetween. A first retarder is disposed on the outer surface of the second transparent substrate, a second retarder is disposed on the first retarder, and a polarizer is disposed on the second retarder. The reflector includes a resin substrate having an irregular surface and a metal reflection layer also having an irregular surface that corresponds to the irregular surface of the reflector. The reflector is attached to the liquid cell so that the metal reflector layer faces the first transparent substrate.

28 Claims, 14 Drawing Sheets

LIQUID CRYSTAL DISPLAY HAVING REFLECTOR OUTSIDE LIQUID CRYSTAL CELL

BACKGROUND OF THE INVENTION

1. Field of the Invention

The present invention relates to a liquid crystal display having a reflector disposed outside a liquid crystal cell. In particular, the present invention relates to a liquid crystal display that achieves a wide viewing angle, a high bright display, and a high contrast without having to provide a retarder between the liquid crystal panel and the reflector outside the liquid crystal panel.

2. Description of the Related Art

Generally, liquid crystal displays can be classified into transflective liquid crystal displays provided with backlights, transmissive liquid crystal displays, and reflective liquid crystal displays depending on the display mode used. Reflective liquid crystal displays do not use backlights and use only external light, such as sunlight and illuminating light. Reflective liquid crystal displays are frequently used in thin, lightweight, portable information terminals that require low power consumption, for example. Reflective liquid crystal displays are provided with reflectors for reflecting the light entering from the display surface. Plates having mirror-finished surfaces or plates having irregular surfaces have been used as the reflectors.

FIG. 19 is a cross-sectional view showing the overall structure of a known reflective liquid crystal display 50 provided with a reflector that has an irregular surface. The reflective liquid crystal display 50 includes a liquid crystal panel 50a comprising: a pair of glass substrates 51 and 52 that face each other; a transparent electrode layer 53 provided on the face of the glass substrate 51 that opposes the glass substrate 52; a transparent electrode layer 54 provided on the face of the glass substrate 52 that opposes the glass substrate 51; an alignment film 55 for aligning liquid crystal, the alignment film 55 being disposed on the transparent electrode layer 53; an alignment film 56 for aligning liquid crystal, the alignment film 56 being disposed on the transparent electrode layer 54; and a liquid crystal layer 57 disposed between the alignment films 55 and 56. The liquid crystal layer 57 is sealed in the gap between the glass substrates 51 and 52 with a sealant 65.

A first retarder 66 is disposed on the outer face of the glass substrate 51 of the liquid crystal panel 50a. A second retarder 67 is disposed on the first retarder 66, and a first polarizer 68 is disposed on the second retarder 67. A second polarizer 69 is disposed on the outer face of the glass substrate 52 of the liquid crystal panel 50a, and a reflector 70 is attached to the outer face of the second polarizer 69 with a transparent bonding layer 70a therebetween.

As shown in FIG. 20, the reflector 70 is, for example, made by sand-blasting the surface of a resin film 71 to form an irregular surface and then forming a reflecting layer 72 on this irregular surface by deposition using aluminum or the like. The reflector 70 is positioned so that the surface provided with the reflecting layer 72 opposes the second polarizer 69.

In the reflective liquid crystal display 50 having the above structure, light incident on the first polarizer 68 is linearly polarized by the first polarizer 68. The linearly polarized light then becomes elliptically polarized as the light is transmitted through the second retarder 67, the first retarder 66, and the liquid crystal layer 57. The elliptically polarized light then becomes linearly polarized as the light is transmitted through the second polarizer 69. The linearly polarized light is then reflected at the reflector 70, transmitted through the second polarizer 69, the liquid crystal layer 57, the first retarder 66, and the second retarder 67, and is emitted from the first polarizer 68.

Generally, liquid crystal displays desirably have good display characteristics such as resolution, contrast, display brightness, and visibility such as a wide viewing angle.

However, in the conventional reflective liquid crystal display 50, because the irregular surface of the reflector 70 subjected to sand-blasting has a poor reflection efficiency, the overall reflectance of the reflective liquid crystal display 50 is low. In other words, the conventional reflective liquid crystal display 50 fails to meet the needs for a reflector that reflects incident light over a greater range of reflection angles. The viewing angle of the reflective liquid crystal display 50 including this reflector 70 is relatively small, i.e., approximately 25 to 35 degrees; furthermore, the brightness of the display is not sufficient.

In contrast to the above-described reflector 70 having an irregular surface, a mirror reflector shows a sharp, high reflectance at a particular angle of reflection (specular angle of reflection) with respect to the angle of incidence. However, the range of reflection angles exhibiting a high reflectance is excessively narrow. As a result, a conventional reflective liquid crystal display having a mirror reflector has a problem of narrow viewing angle.

An attempt has been made to improve the brightness of the white display during application of selection voltages by reducing the number of the polarizer used in the liquid crystal display. That is, the second polarizer 69 between the glass substrate 52 and the reflector 70 is removed, and only the first polarizer 68 disposed on the second retarder 67 is used. However, in such a reflective liquid crystal display in which one of the polarizers is removed, the reflection efficiency of the reflector 70 is still low. Thus, both the white display and the black display become bright, thereby degrading the contrast.

The present inventors have been studying the type of reflector shown in FIG. 21. A reflector 51 shown in FIG. 21 is, for example, made by sequentially forming many concavities 54 in a resin substrate 53 composed of photosensitive resin or the like disposed on a substrate 52 composed of glass or the like, each of the concavities 54 having a curved inner surface that represents part of a spherical surface, and forming a reflecting film 55 by vapor deposition or printing using, for example, aluminum or silver, on the resin substrate 53 provided with the concavities 54.

The concavities 54 are formed at random at a depth ranging from 0.1 to 3 $\mu$m. The pitch between adjacent concavities 34 is also randomly set within the range of 5 to 50 $\mu$m. The inner surface of each of the concavities 54 is curved and represents part of a spherical surface. The angle of the slope of the curved inner surface is set within the range of −18 to +18.

Note that in this specification, the term "depth of the concavity" is defined as the distance between the surface of the substrate of the reflector and the bottom of the concavity. The term "pitch between adjacent concavities" is defined as the distance between the centers of the circles of the adjacent concavities in a plan view of the concavities 54. The term "tilt angle" is defined as an angle formed by a tangential line and the substrate surface at any point of the inner surface of the concavity 54 in a particular vertical cross-section.

The reflector 51 shown in FIG. 21 has the reflection characteristic shown in FIG. 16. In FIG. 16, the reflection characteristic of the reflector 51 is shown as that of the Comparative Example described below. FIG. 16 is a graph showing a reflection characteristic curve at an incident angle of 30 degrees. In the graph, the vertical axis shows the reflectance (reflection intensity), and the horizontal axis shows the angle of reflection.

As shown in FIG. 22, the angle of incidence is the angle $\omega_0$ between a normal line H perpendicular to the reflector 51 (the substrate surface) and incident light J. The angle of reflectance is an angle $\omega$ between the normal line H and the reflected light K in a plane that includes the normal line H and the incident light J. The angle of specular reflectance is the angle at which the incident angle $\omega_0$ is equal to the reflectance angle $\omega$.

As shown in FIG. 16, the reflector 51 has a sufficient reflectance around a reflection angle of 30 degrees, i.e., the angle of specular reflection, and more particularly in the range of $15° \leq \omega \leq 45°$.

The conventional reflector 51 described above exhibits a relatively good reflectance over a relatively wide range of angles because of the concavities 54. However, as shown in FIG. 16, the reflectance peaks at reflection angles of 15 and 45 degrees and is low around a reflection angle of 30 degrees, i.e., the angle of specular reflection. Accordingly, although the reflector 51 achieves a relatively good reflectance over a particular range, the brightness is slightly degraded in the direction of the specular reflection.

When a display device is mounted in a particular device such as a notebook computer, a desk calculator, or a wristwatch, the angle between the direction of a light source and the display device, i.e., the angle of incidence, and the angle between the line of sight of a user who receives the reflected light and the display device, i.e., the angle of reflection or the receiving angle, are usually within specific ranges. Users desire an increase in the reflection intensity in a particular direction as well as a bright display over a wide range of angles.

Furthermore, when the above reflector 51 that achieves bright display over a wide range of angles is used in a liquid crystal device provided with a backlight, the surface of the reflector 51 excessively scatters the light from the backlight, thereby reducing the amount of light emitted in the direction most advantageous for the users.

SUMMARY OF THE INVENTION

An object of the present invention is to provide a liquid crystal display having a wide viewing angle, a bright display, and a high contrast without having to provide a polarizer between the liquid crystal panel and the reflector outside the liquid crystal panel.

To overcome the problems of the conventional art, the present invention provides a reflector that has a high reflectance over a wide range of angles and a particularly high reflectance over a reflection range slightly shifted from the direction of specular reflection and that does not excessively scatter light when a backlight is used. The present invention also provides a reflective liquid crystal display incorporating the reflector of the present invention that achieves bright display over a wide range of angles and has an adequate directivity toward a normal viewing range.

The present invention provides a liquid crystal display including: a liquid crystal cell including, a first transparent substrate, a second transparent substrate opposing the first transparent substrate, a liquid crystal layer disposed between the first transparent substrate and the second transparent substrate, a first transparent electrode formed on an inner surface of the first transparent substrate, the inner surface opposing the second transparent substrate, a first alignment film formed on the first transparent electrode, a second transparent electrode formed on an inner surface of the second transparent substrate, the inner surface opposing the first transparent substrate, and a second alignment film formed on the second transparent electrode; a reflector attached on an outer surface of the first transparent substrate with a bonding layer therebetween; a first retarder disposed on an outer surface of the second transparent substrate; a second retarder disposed on the first retarder; and a polarizer disposed on the second retarder. The reflector includes a resin substrate having an irregular surface and a metal reflection film disposed on the irregular surface of the resin substrate, the surface of the metal reflection film being also irregular due to the irregular surface of the resin substrate, and the reflector is arranged so that the metal reflection film opposes the first transparent substrate.

Preferably, the resin substrate is formed by preparing a mold having irregularities, curing a photocurable resin layer using light while pressing the mold onto the surface of the photocurable resin layer, separating the mold from the cured resin layer so that the cured resin layer has irregularities that resemble inverted shapes of the irregularities of the mold. Subsequently, a metal reflection layer is deposited on the irregular surface of the resin substrate, the surface of the metal reflection layer also being irregular due to the irregular surface of the resin substrate. Any type of irregular surface can be formed on the surface of the resin substrate and the metal reflection film by using a mold having desired irregularities. Thus, a reflector having a desired reflection characteristic can be obtained.

Preferably, the irregular surface of the reflector has many grooves extending in one direction and having the same radius of curvature R at a curved cross-section. The widths of these grooves are preferably varied at random so as not to generate any interference pattern due to the light reflected at these grooves. With this reflector, the reflection efficiency can be improved and bright display can be achieved since light that entered the reflector in a direction perpendicular to the direction of the grooves is reflected over a wide range of angles. Moreover, a wider range of reflection angles can be obtained by varying the widths of the adjacent grooves.

Alternatively, the irregular surface of the reflector is made by forming a set of grooves having the same radius of curvature R at a curved cross-section and extending in one direction and another set of grooves extending in the direction orthogonal to this direction. The widths of the grooves are preferably varied at random so as to prevent generation of an interference pattern due to the light reflected at these grooves. With this reflector, the reflection efficiency can be further improved, and a brighter display can be achieved since the light that entered the reflector in directions perpendicular to the directions of grooves is reflected over a wider range of angles. The angle at which the set of grooves intersects the other set of grooves may be any angle as long as the above-described effects can be obtained. Moreover, a wider range of reflection angles can be obtained by varying the widths of the adjacent grooves.

Each of the above-described grooves may be linear or curved. Preferably, the grooves are curved at a predetermined radius of curvature. In this manner, the reflection efficiency can be further improved because the pitches and depths of the grooves are varied at random. Moreover, a bright display can be achieved over a wide viewing angle since the grooves are curved.

Because the reflector having the above-described structure is used in the liquid crystal display of the present invention, a brighter display over a wide range of viewing angles can be obtained compared with a conventional liquid crystal display including a reflector that has an irregular surface made by sand-blasting.

Since the liquid crystal display of the invention includes the above-described reflector exhibiting a superior reflection efficiency, superior display characteristics can be achieved even when a polarizer is formed on the outer surface of only one of the transparent substrates that constitute the liquid crystal cell. In other words, bright display and a high contrast can be achieved even when only one polarizer is provided to the liquid crystal display because the reflector has a higher reflectance in the white display state (the bright display state). Since only one polarizer is necessary to achieve a high contrast and superior display characteristics, the cost can be reduced compared to the conventional liquid crystal display using two polarizers above and below the liquid crystal cell.

Moreover, in the liquid crystal display of the present invention, the reflector is installed outside the liquid crystal cell, and the reflector can be bonded to the reflector at normal temperature. In other words, the liquid crystal cell and the reflector can be prepared separately in advance, and can be bonded later. In this manner, the degradation of the liquid crystal can be prevented since the liquid crystal cell 1 is free of thermal stresses which would otherwise be imposed during manufacture of the reflector, and since chemicals or the like used in manufacture of the reflector do not come into contact with the liquid crystal cell.

In the liquid crystal display of the present invention having the above-described structure, a color filter may be provided between the first transparent substrate and the first transparent electrode.

Preferably, in the liquid crystal display of the present invention, the liquid crystal layer has a helical structure twisted through 240 to 250 degrees along the thickness direction of the liquid crystal layer, and a retardation $\Delta nd_{LC}$ of the liquid crystal cell is in the range of 600 to 800 nm. The retardation $\Delta nd_{RF1}$ of the first retarder preferably is in the range of 100 to 200 nm, and the angle $\phi_{RF1}$ between the delay axis β of the first retarder and a bisecting direction X is preferably in the range of 60 to 100 degrees counterclockwise when viewed in the direction perpendicular to the surface of the second transparent substrate from the light-incident side. The retardation $\Delta nd_{RF2}$ of the second retarder is preferably in the range of 300 to 500 nm, and the angle $\phi_{RF2}$ between the delay axis γ of the second retarder and the bisecting direction X is preferably in the range of 90 to 140 degrees counterclockwise when viewed in the direction perpendicular to the surface of the second transparent substrate from the light-incident side. The absorption axis α of the polarizer is preferably arranged so that the angle $\phi_{pol}$ between the absorption axis α and the bisecting direction X is in the range of 20 to 70 degrees or 110 to 160 degrees counterclockwise. Herein, the bisecting direction X is the direction of an axis that passes through the intersection O of an alignment direction a of the second alignment film and an alignment direction b of the first alignment film when viewed in the direction perpendicular to the surface of the second transparent substrate from the light-incident side, and that bisects the inner angle between the alignment direction a and the alignment direction b.

With this structure, a brighter white display and a higher contrast can be achieved.

Preferably, the liquid crystal layer has a helical structure twisted through 240 degrees along the thickness direction of the liquid crystal layer, and a retardation $\Delta nd_{LC}$ of the liquid crystal cell is in 700 nm. The retardation $\Delta nd_{RF1}$ of the first retarder is preferably 169 nm, and the angle $\phi_{RF1}$ between the delay axis β of the first retarder and a bisecting direction X is preferably 82 degrees counterclockwise when viewed in the direction perpendicular to the surface of the second transparent substrate from the light-incident side. The retardation $\Delta nd_{RF2}$ of the second retarder is preferably 425 nm, and the angle $\phi_{RF2}$ between the delay axis γ of the second retarder and the bisecting direction X is 113 degrees counterclockwise when viewed in the direction perpendicular to the surface of the first transparent substrate. The absorption axis α of the polarizer is preferably arranged so that the angle $\phi_{pol}$ between the absorption axis α and the bisecting direction X is 42.5 degrees counterclockwise. The definition of the bisecting direction X is the same as described above. With this structure, a further brighter white display and a higher contrast can be achieved.

Preferably, the first retarder has an $N_Z$ coefficient in the range of −0.5 to 2.0, and the second retarder has an $N_Z$ coefficient in the range of −0.5 to 2.0, the $N_Z$ coefficients being determined by equation (1):

$$N_Z=(n_x-n_y)/(n_x-n_y) \qquad (1)$$

wherein $n_x$ is the refractive index of a retarder in the X axis direction, $n_y$ is the refractive index of a retarder in the Y axis direction, and $n_y$ is the refractive index of a retarder in the Z axis direction. With this structure, the range of angles that exhibits higher contrast can be extended in all directions. Thus, the viewing angle can be made wider in all directions, thereby achieving a superior viewing angle characteristic.

More preferably, the first retarder has an $N_Z$ coefficient of 0.5, and the second retarder has an $N_Z$ coefficient of 0.3 to further extend the range of angles that exhibits higher contrast and to achieve a wide viewing angle.

Preferably, the liquid crystal that constitutes the liquid crystal layer has a wavelength dispersion characteristic of the birefringence $\Delta n_{LC}$ lower than those of the birefringence $\Delta n_{RF1}$ of the first retarder and the birefringence $\Delta n_{RF2}$ of the second retarder to achieve high contrast and superior display characteristics.

In the liquid crystal display of the present invention, the reflector preferably further includes a plurality of concavities that reflect light formed in the surface of the reflector, each of the plurality of concavities having a first vertical cross-section and a second vertical cross-section that pass through the deepest point of the concavity. The first vertical cross-section showing a shape of the inner surface of the concavity preferably has a first curved line from an edge of the concavity to the deepest point and a second curved line from the deepest point of the concavity to another edge of the concavity. The average absolute value of tilt angles of the first curved line with respect to the surface of the reflector is preferably larger than that of the second curved line. The second vertical cross-section shows another shape of the inner surface of the concavity. The second vertical cross-section is orthogonal to the first vertical cross-section and has a gentle curved line and two sharp curved lines extending from the two ends of the gentle curved line, the two sharp curved lines having a radius of curvature smaller than that of the gentle curved line.

No limit is imposed as to the direction in which these vertical cross-sections are taken. Preferably, the first vertical cross section is taken in a vertical direction when viewed from an observer.

Since the reflector is provided with a plurality of concavities having curved, reflective inner surfaces, the display range having a high brightness can be extended while exhibiting an adequate light dispersion characteristic that prevents reflection.

In the first vertical cross sections of concavities, the first curved lines are relatively sharp and the second curved lines are relatively gentle. The second curved lines are longer than the first curved lines.

Accordingly, the amount of light reflected at the planes of the second curved lines is larger than the amount of light reflected at the planes of the first curved lines. In other words, light is reflected in such a manner that the luminous flux in the direction of specular reflection relative to the plane of the second curved line is high. Accordingly, the reflection intensity of the reflector as a whole can be increased in a particular direction or directions by aligning first curved lines of the concavities in a particular direction or directions.

Furthermore, since the second vertical cross section has the gentle curved line and the sharp curved lines extending from the ends of the gentle curved line, the reflectance in the direction of the specular reflection can be substantially increased. The sharp curved lines are preferably uniform.

As a result, the overall reflection characteristics at the first vertical cross section provide the peak of reflectance at the angle of the specular reflection, and an increased reflectance in the direction of light reflected at the planes around the second curved lines. In other words, the reflected light can be adequately concentrated in a particular direction while maintaining sufficient reflectance in the direction of specular reflection.

Preferably, the first vertical cross-sections of the concavities are aligned in one direction, and the second vertical cross-sections of the concavities are aligned in one direction. The first curved lines and the second curved lines are preferably aligned in the same direction. With this structure, the reflectance in the direction of light reflected at the planes around the second curved lines can be increased, and the reflected light can be adequately concentrated in a particular direction.

Preferably, in each of the plurality of concavities, tilt angles of the first curved line and the second curved line relative to the surface of the reflector are zero in the region of the inner surface of the concavity where the first curved line meets the second curved line. Preferably, the tilt angle of the first curved line gradually becomes gentle as the first curved line extends from the edge to the deepest point of the concavity, and the tilt angle of the second curved line gradually becomes gentle as the second curved line extends from another edge to the deepest point of the concavity, thereby rendering a tilt angle of zero at the point where the first curved line meets the second curved line.

In this manner, the inner surface of the concavity can be made smooth, and a decrease in reflectance in the direction of specular reflection can be prevented.

Preferably, the depths of the concavities are varied at random within the range of 0.1 to 3 $\mu$m.

At a depth less than 0.1 $\mu$m, the effect of light dispersion is insufficient. At a depth exceeding 3 $\mu$m, the thickness of the substrate must be increased, thereby causing a problem in manufacture and disadvantages as end products. When the depths of the concavities are varied at random, generation of a moire pattern due to the interference of light, the phenomenon which is frequent in the reflector including concavities having regular depths, can be prevented. Moreover, the peak of the reflectance at a particular viewing angle can be made gentle, thereby giving a gentle curve of reflectance within a viewing range.

The concavities are preferably arranged at random and are preferably adjacent to one another. When the concavities are separated from one another, the gaps between the concavities provide flat planes, and thus reflection at these flat planes increases. As a result, sufficient diffused reflection cannot be achieved within a limited pixel region. The concavities are preferably arranged at random so as not to generate a moire pattern.

In the liquid crystal display of the present invention having a reflector including the plurality of concavities having the first vertical cross-sections aligned in one direction, the second vertical cross-sections aligned in one direction, and the first curved lines aligned in one direction, the reflector is preferably disposed so that, in each of the plurality of concavities, the first curved line is arranged above the second curved line when viewed from an observer. With this structure, external light entering mainly from above the display can be reflected while being shifted in a direction closer to the normal line with respect to the display surface.

Since light from above an observer is efficiently reflected at the planes around the second curved lines, the amount of reflected light increases when viewed from the observer.

Moreover, since light is reflected at the gentle curved line of the second vertical cross-section, a sufficient amount of light can be reflected in the direction of the specular reflection.

Thus, the amount of light reflecting in the direction of the observer's line of sight can be increased, and a practical reflective liquid crystal display having a bright display can be realized.

Preferably, the reflectance of the reflector has a peak at an angle of specular reflection, and an integrated reflectance over reflection angles smaller than the angle of specular reflection is different from that over reflection angles larger than the angle of specular reflection.

According to the present invention, when the regular viewing angle of an observer is shifted from the direction of specular reflection, the reflector can concentrate the reflected light in the direction of this regular viewing angle while maintaining sufficient light reflected in the direction of specular reflection.

Preferably, in the liquid crystal display according to the present invention, the reflectance of the reflector has a peak at an angle of specular reflection relative to the substrate surface, and an integrated reflectance over reflection angles smaller than the angle of specular reflection is different from that over reflection angles larger than the angle of specular reflection. More preferably, the reflection angles that exhibit a higher integrated reflectance are smaller than the angle of specular reflection with respect to the substrate surface.

With this structure, external light entering the reflector mainly from above can be reflected in the direction close to the normal direction relative to the substrate surface instead of downward direction when viewed from an observer. Thus, the reflective liquid crystal display of the present invention has an increased amount of light reflected in the direction of the viewing angle of the observer and achieves practical, bright display when the display is used as the display unit of a cellular phone or a notebook computer.

DESCRIPTION OF THE PREFERRED EMBODIMENTS

First Embodiment

A first embodiment of the present invention will now be described in detail.

Figure 1:
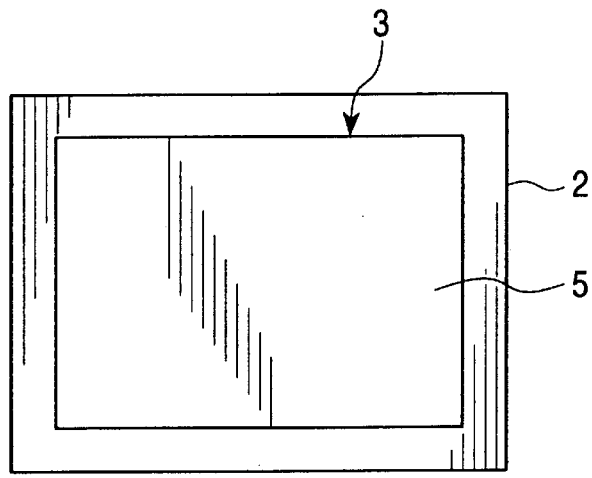
FIG. 1 is a front view of a display unit of a portable information terminal having a reflective liquid crystal display according to an embodiment of the present invention.

FIG. 1 is a front view of a display unit of a portable information terminal incorporating a liquid crystal display according to a first embodiment of the present invention. The liquid crystal display of this embodiment is a super twisted nematic (STN) reflective liquid crystal display.

The display unit of the portable information terminal of this embodiment has a frame 2 and a reflective liquid crystal display 3 of the present invention. The reflective liquid crystal display 3 is inside the frame 2. The reflective liquid crystal display 3 of this embodiment is of a type that is laid horizontally when used.

Figure 2:
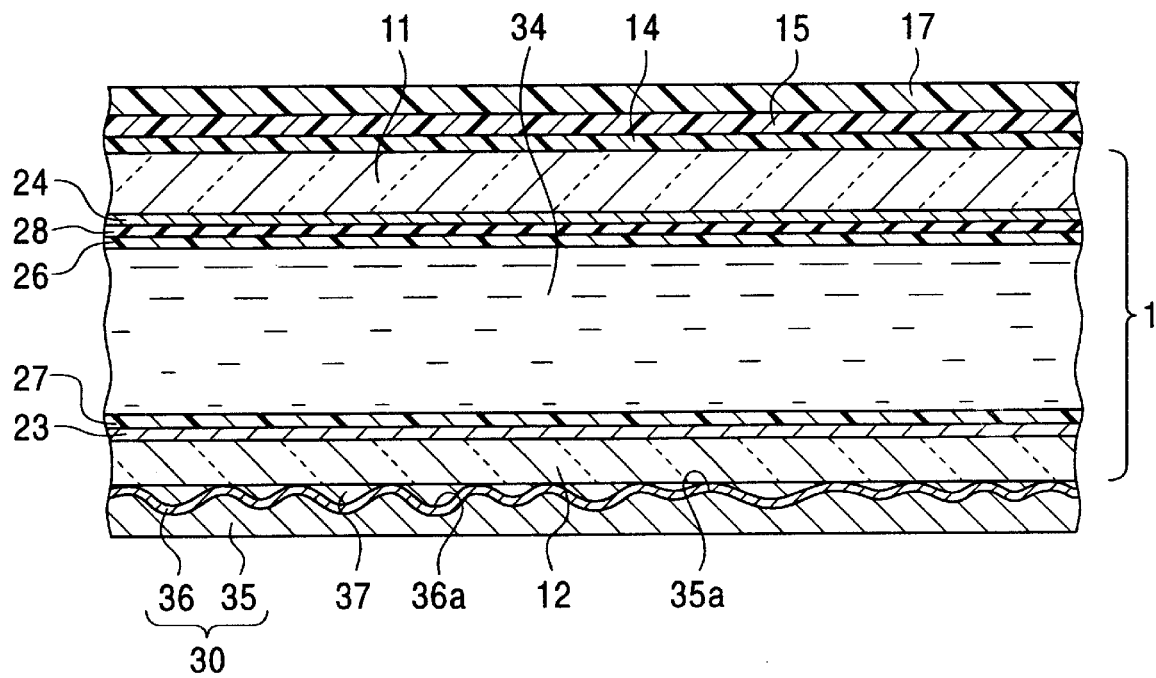
FIG. 2 is a cross-sectional view showing a first embodiment of a reflective liquid crystal display of the present invention, the reflective liquid crystal display being a super twisted nematic type.

As shown in FIG. 2, the reflective liquid crystal display 3 of this embodiment includes a liquid crystal cell 1, a first retarder 14 disposed on the outer surface of an upper glass substrate 11 of the liquid crystal cell 1, a second retarder 15 disposed on the first retarder 14, and a polarizer 17 disposed on the second retarder 15. A reflector 30 is disposed on the outer surface of a lower glass substrate 12 of the liquid crystal cell 1.

The liquid crystal cell 1 is constituted from the upper and lower glass substrates 11 and 12, which oppose each other, a common electrode 23 disposed on the inner surface of the lower glass substrate 12, a lower alignment film 27 disposed on the common electrode 23, a segmented electrode 24 disposed on the inner surface of the upper glass substrate 11, a top coat 28 disposed under the segmented electrode 24, an upper alignment film 26 disposed under the top coat 28, and a liquid crystal layer 34 disposed between the upper alignment film 26 and the lower alignment film 27, as shown in FIG. 2.

The upper alignment film 26 and the lower alignment film 27 are commonly used transparent alignment films. For example, the upper and lower alignment films 26 and 27 are polymer films, such as polyimide films, subjected to rubbing.

Figure 3:
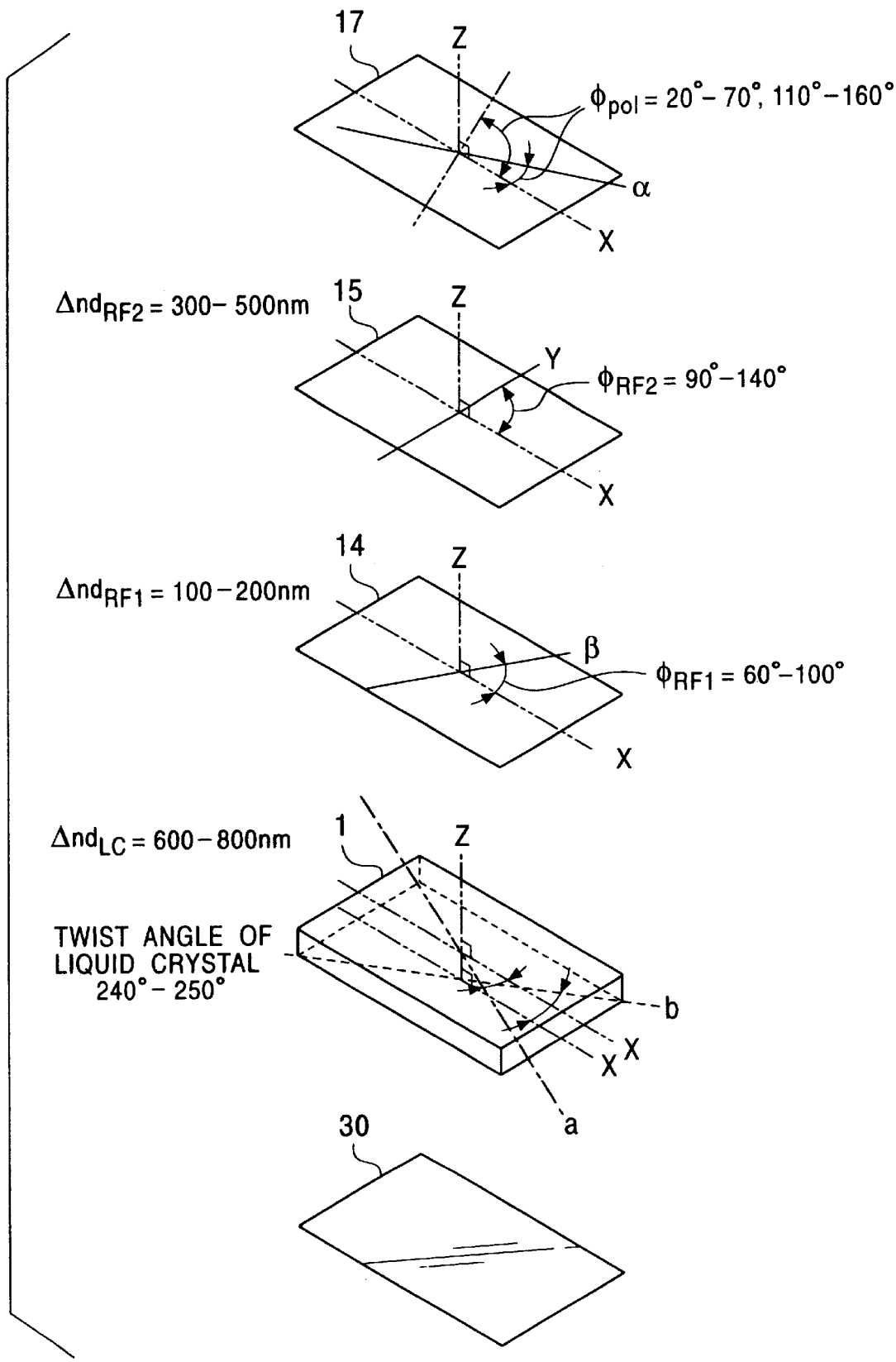
FIG. 3 is a partial assembly view of the reflective liquid crystal display of the first embodiment of the present invention.
Figure 4:
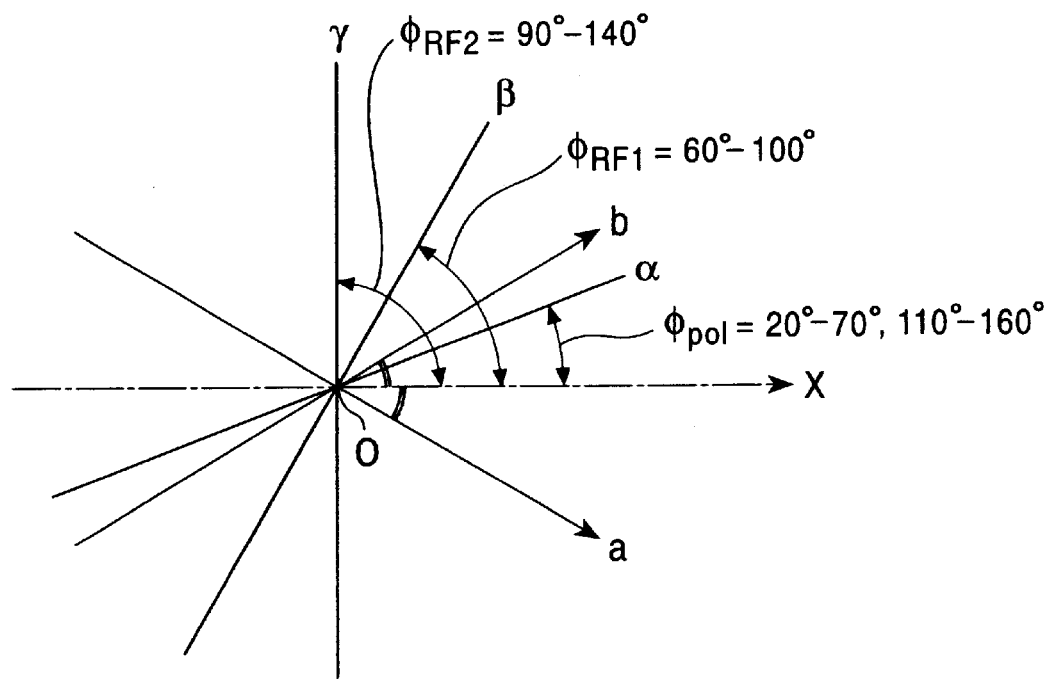
FIG. 4 is a plan view showing the arrangement of the absorption axis a of α polarizer, the delay axis β of a first retarder, the delay axis γ of a second retarder, the alignment direction a of an upper alignment film, and the alignment direction b of a lower alignment film.

Referring now to FIGS. 3 and 4, the alignment direction, i.e., the rubbing direction, a of the upper alignment film 26 is −35 to −25 degrees, and more preferably −30 degrees, i.e., +330 degrees, when viewed in a direction perpendicular to the surface of the film. In this specification, the notation "−" before the number of degrees indicates that the angle is taken clockwise, and the notation "+" before the number of degrees indicates that the angle is taken counterclockwise.

In this embodiment, the alignment direction, i.e., the rubbing direction, b of the lower alignment film 27 is within the range of +25 to +35, and more preferably, +30, as shown in FIGS. 3 and 4.

Referring now to FIG. 4, a bisecting direction X is the direction of an axis that passes through the intersection O of the above-described alignment directions a and b of the upper and lower alignment film 26 and 27 and that bisects the inner angle defined by the alignment directions a and b when viewed in the direction perpendicular to the film surface.

In FIG. 3, the direction orthogonal to the surface of each of the liquid crystal cell 1, the first retarder 14, the second retarder 15, and the polarizer 17 is defined as the Z direction.

The liquid crystal layer 34 preferably has a helical structure twisted through 240 to 250 degrees, and more preferably through 240 degrees, along the thickness direction of the liquid crystal layer 34. In other words, the twist angle of the liquid crystal molecules constituting the liquid crystal layer 34 is preferably between 240 to 250 degrees and more preferably, 240 degrees. The liquid crystal layer 34 is constituted from liquid crystal molecules enclosed in the region surrounded by the upper alignment film 26, the lower alignment film 27, and a sealant (not shown in the drawing) for bonding the upper alignment film 26 and the lower alignment film 27 with a predetermined gap therebetween. The liquid crystal molecules are nematic at room temperature and are of a super twisted nematic (STN) type.

In order to achieve high contrast and superior display characteristics, liquid crystal that constitutes the liquid crystal layer 34 preferably has a wavelength dispersion for the birefringence $\Delta n_{LC}$ lower those for the birefringence $\Delta n_{RF1}$ of the first retarder 14 and the birefringence $\Delta n_{RF2}$ of the second retarder 15.

The wavelength dispersion for $\Delta n_{LC}$ of the liquid crystal constituting the liquid crystal layer 34 may be changed by changing the liquid crystal material. The wavelength dispersion for $\Delta n_{RF1}$ of the first retarder 14 and for $\Delta n_{RF2}$ of the second retarder 15 can be changed by changing the retarder material.

The top coat 28 is provided to ensure insulation and is composed of an inorganic material such as silica or $ZrO_2$.

The upper glass substrate 11 is made of soda-lime glass in this embodiment. The material and the thickness of the upper glass substrate 11 vary depending on the type of liquid crystal display. However, the thickness of the upper glass substrate 11 is preferably 0.3 to 1.1 mm in this embodiment.

The lower glass substrate 12 is made of soda-lime glass containing an oxide of an alkali metal such as sodium in this embodiment. The material for the lower glass substrate 12 varies depending on the type of liquid crystal display. The thickness of the lower glass substrate 12 is preferably in the range of 0.3 to 1.1 mm.

The reflector 30 reflects and scatters incident light to achieve a wide viewing angle.

Figure 5:
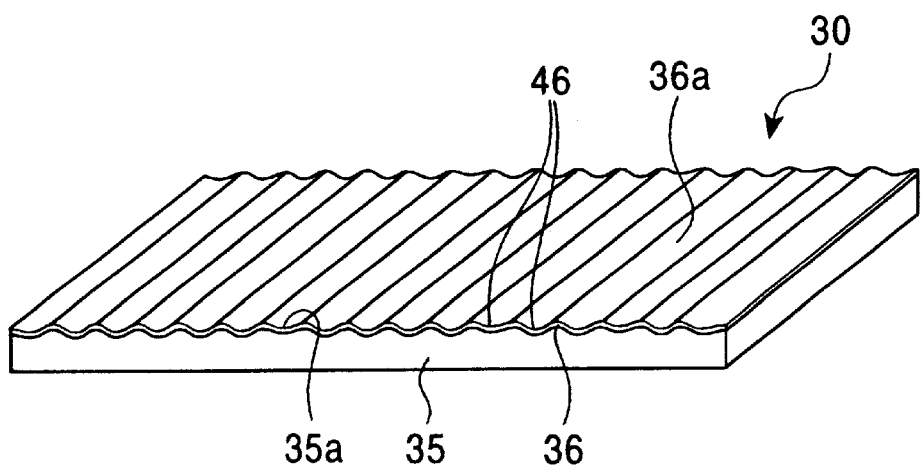
FIG. 5 is a perspective view showing an embodiment of a reflector included in the reflective liquid crystal display of the first embodiment.

As shown in FIG. 5, the reflector 30 comprises a resin substrate 35 having an irregular surface 35a, and a metal reflection film 36 formed on the irregular surface 35a. The metal reflection film 36 has an irregular surface 36a that corresponds to the irregular surface 35a. The irregular surface 36a functions as a reflecting surface.

The metal reflection film 36 may be composed of gold, silver, or a gold or silver alloy. Other materials may also be used as long as they exhibit a superior reflecting characteristic.

As shown in FIG. 5, the irregular surface 36a of the metal reflection film 36 has many grooves 46, whose curved cross-sections have the same radius of curvature R, which extend in the same direction. The widths of the grooves 46 are varied at random so as not to generate any interference pattern due to the light reflected at the grooves 46. At a radius of curvature R exceeding 100 μm, the grooves 46 become noticeable, thereby drastically degrading the display quality of the reflective liquid crystal display 3; hence, the radius of curvature R is preferably 100 μm or less. At a radius of curvature R less than 0.4 μm, i.e., below the wavelength of visible light, sufficient reflection characteristics cannot be obtained; hence, the radius of curvature R is preferably 0.4 μm or more.

As shown in FIG. 2, the reflector 30 is bonded onto the lower glass substrate 12 of the liquid crystal cell 1 with a transparent bonding layer 37 composed of an epoxy material containing fluorine so that the metal reflection film 36 faces the lower glass substrate 12.

The retardation $\Delta nd_{LC}$, which is the product of the birefringence $\Delta n_{LC}$ of the liquid crystal cell 1 and a thickness d of the liquid crystal cell 1, is set within the range of 600 to 800 nm at a measuring wavelength of 589 nm. When $\Delta nd_{LC}$ is not within this range, the white display becomes dark, and the contrast is degraded.

Moreover, $\Delta n_{LC}$ is preferably in the range of 690 to 705 nm, and more preferably, 700 nm to achieve a high contrast and excellent monochrome display.

The first retarder 14 and the second retarder 15 are composed of a uniaxially or biaxially stretched film of polyvinyl alcohol, polycarbonate, or the like. The delay axis of the first retarder 14 is determined by the stretching direction.

The retardation $\Delta nd_{RF1}$ of the first retarder 14 is set within the range of 100 to 200 nm at a measuring wavelength of 589 nm. At $\Delta nd_{RF1}$ outside the above-described range, a high contrast and bright white display cannot be obtained. Preferably, $\Delta nd_{RF1}$ is 169 nm.

Referring now to FIGS. 3 and 4, the delay axis β of the first retarder 14 is arranged so that the angle $\phi_{RF1}$ between the delay axis β and the bisecting direction X is +60 to +100. When the delay axis β is not within the above range, a high contrast or bright white display cannot be achieved. More preferably, the angle $\phi_{RF1}$ between the delay axis β and the bisecting direction X is +82 degrees to achieve a high contrast and superior monochrome display.

The retardation $\Delta nd_{RF2}$ of the second retarder 15 is set within the range of 300 to 500 nm at a measuring wavelength of 589 nm. At $\Delta nd_{RF2}$ outside the above-described range, high contrast or superior monochrome display cannot be obtained. Preferably, $\Delta nd_{RF2}$ is 425 nm. As shown in FIG. 3, the delay axis γ of the second retarder 15 is arranged so that the angle $\phi_{RF2}$ between the delay axis γ and the bisecting direction X is +90 to +140 degrees. When the delay axis γ is not within the above range, a high contrast or a bright white display cannot be achieved. More preferably, the angle $\phi_{RF2}$ between the delay axis γ and the bisecting direction X is +113 degrees to achieve a high contrast and superior monochrome display.

The $N_Z$ coefficient of the first retarder 14 determined by equation (1) below is preferably in the range of −0.5 to 2.0:

$$N_Z=(n_x-n_z)/(n_x-n_y) \quad (1)$$

wherein $n_x$ is the refractive index of the retarder in the X axis direction, $n_y$ is the refractive index of the retarder in the Y axis direction, and $n_z$ is the refractive index of the retarder in the Z axis direction. The $N_Z$ coefficient of the second retarder 15 determined by equation (1) above is preferably in the range of −0.5 to 2.0 In this manner, excellent contrast can be achieved over a larger region of a display surface 5 of the reflective liquid crystal display 3 and the viewing angle of the display panel 5 can be made wider in every direction, thereby achieving superior viewing-angle characteristics.

More preferably, the $N_Z$ coefficient of the first retarder 14 determined by equation (1) is 0.5 and the $N_Z$ coefficient of the second retarder 15 determined by equation (1) is 0.3 so as to further enlarge the region that exhibit a superior contrast, to widen the viewing angle of the display panel 5, and to achieve more superior viewing angle characteristics.

As shown in FIGS. 3 and 4, the polarizer 17 is arranged so that the angle $\phi_{pol}$ between the absorption axis α of the polarizer 17 and the bisecting direction X is +20 to +70, or +110 to +160.

When the absorption axis α of the polarizer 17 is not within the above range, satisfactory monochrome display with a high contrast cannot be achieved. The absorption axis α is preferably arranged so that the angle $\phi_{pol}$ between the absorption axis α of the polarizer 17 and the bisecting direction X is +42.5 so as to achieve high contrast and satisfactory monochrome display.

Since the reflective liquid crystal display 3 of this embodiment has the reflector 30 having the above features, the reflection efficiency is improved compared to the conventional display in which a reflector having an irregular surface made by sandblasting is provided. Thus, a bright display face and a wide viewing angle can be achieved.

Since the reflector 30 having a superior reflection efficiency is used in the liquid crystal display of this embodiment, a high reflectance (transmittance) can be achieved during white display even when no polarizer is provided on the outer surface of the upper glass substrate 11 of the liquid crystal cell 1, i.e., even when only one polarizer is used. As a result, an increase in contrast and superior display characteristics can be achieved, and the cost can be reduced compared to the conventional liquid crystal display using two polarizers above and below the liquid crystal cell.

Moreover, in the liquid crystal display of the present invention, the reflector 30 is installed outside the liquid crystal cell 1, and the reflector 30 can be bonded to the liquid crystal cell 1 at a normal temperature. In other words, the liquid crystal cell 1 and the reflector 30 can be prepared separately in advance, and can be bonded later. In this manner, the degradation of the liquid crystal can be prevented since the liquid crystal cell 1 is free of thermal stresses which would otherwise be imposed during manufacture of the reflector 30, and since chemicals and so on used in manufacture of the reflector 30 do not come into contact with the liquid crystal cell 1.

In the liquid crystal display of this embodiment, the twist angle of the liquid crystal layer 34 along the thickness direction, the retardation $\Delta nd_{LC}$ of the liquid crystal constituting the liquid crystal layer 34, the angle $\phi_{RF1}$ between the delay axis β and the bisecting direction X, the retardation $\Delta nd_{RF1}$ of the first retarder 14, the angle $\phi_{RF2}$ between the delay axis γ of the second retarder 15 and the bisecting direction X, the retardation $\Delta nd_{RF2}$ of the second retarder 15, and the angle $\phi_{pol}$ between the absorption axis α of the polarizer 17 and the bisecting direction X are adjusted within the above-described ranges to achieve bright white display and a higher contrast.

The $N_Z$ coefficients of the first retarder 14 and second retarder 15 determined by equation (1) above are adjusted in the above-described ranges so as to increase the area of the display panel exhibiting a superior contrast and widen the viewing angle in all directions, thereby achieving more superior viewing angle characteristics.

Figure 6:
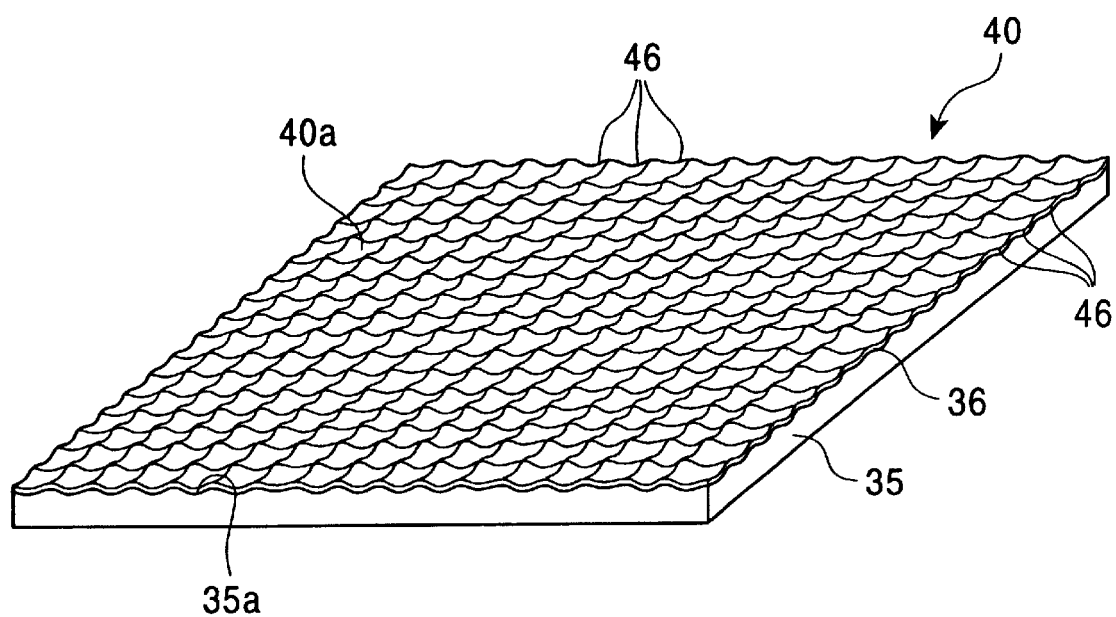
FIG. 6 is a perspective view showing another embodiment of a reflector included in the reflective liquid crystal display of the first embodiment.

Instead of the reflector 30 having the above structure, a reflector 40 comprising the metal reflection film 36 shown in FIG. 6 may be used in the reflective liquid crystal display 3. The metal reflection film 36 has an irregular surface 40a, in which a set of grooves 46, whose curved cross-sections have the same radius of curvature R, which extend in one direction intersects another set of grooves 46, whose curved cross-sections have the same radius of curvature R, which extend in the direction orthogonal to the above direction. The widths of the grooves 46 extending in these directions are varied at random so as to prevent the generation of any interference pattern due to the light reflected at the grooves 46. The reflective liquid crystal display 3 using this reflector 40 will exhibit an increased reflection efficiency and have a bright display surface since light entering from directions orthogonal to the directions of the grooves 46 is reflected over a wide range of angles.

The reflective liquid crystal display 3 of this embodiment has its long side lying in the horizontal direction. Alternatively, the reflective liquid crystal display 3 may have its long side lying in the vertical direction.

Although the top coat 28 is disposed between the upper alignment film 26 and the segmented electrode 24 in the above embodiment, it is not necessary for the top coat 28 to be formed, depending on the type of liquid crystal display and the required characteristics.

Moreover, the liquid crystal display of this embodiment is a monochrome display. Alternatively, a color filter may be formed between the common electrode 23 and the lower glass substrate 12 so as to form a reflective color liquid crystal display. In such a case, a first overcoat for planarizing the irregularities of the color filter may be provided between the common electrode 23 and the color filter.

Although the liquid crystal display of this embodiment is of a reflective type, the liquid crystal display 3 may be of a transflective type. In such a case, a transparent resin material is used to form the resin substrate 35, the thickness of the metal reflection film 36 is adjusted to 80 to 500 Å, and a light source such as backlight is disposed under the reflector 30.

Second Embodiment

Figure 11:
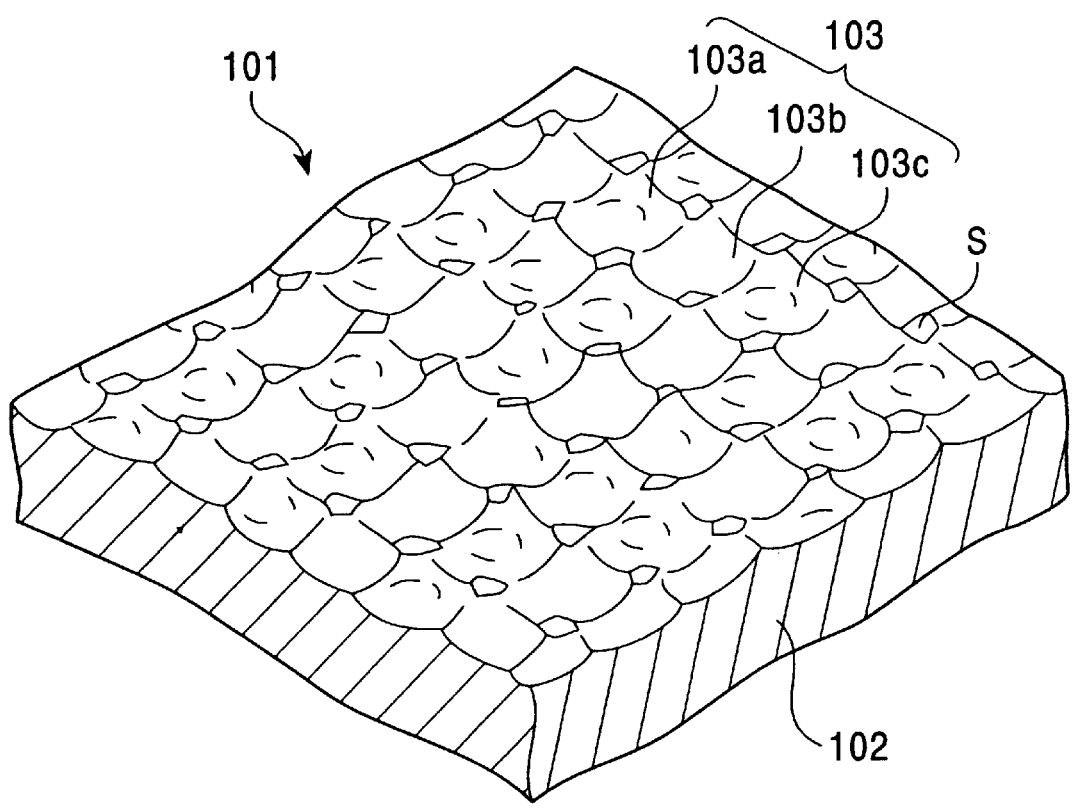
FIG. 11 is a perspective view showing part of a reflector according to a second embodiment of the present invention.

FIG. 11 is a partial perspective view of a reflector 101 used in the reflective liquid crystal display 3 according to a second embodiment of the present invention. As shown in FIG. 11, the reflector 101 of this embodiment comprises a base plate 102 composed of, for example, aluminum, surfaces S, i.e., reference surfaces, and a plurality of concavities 103a, 103b, 103c, etc., hereinafter generally referred to as the "concavities 103". The concavities 103 reflect light and are arranged at random adjacent with one another.

Figure 12:
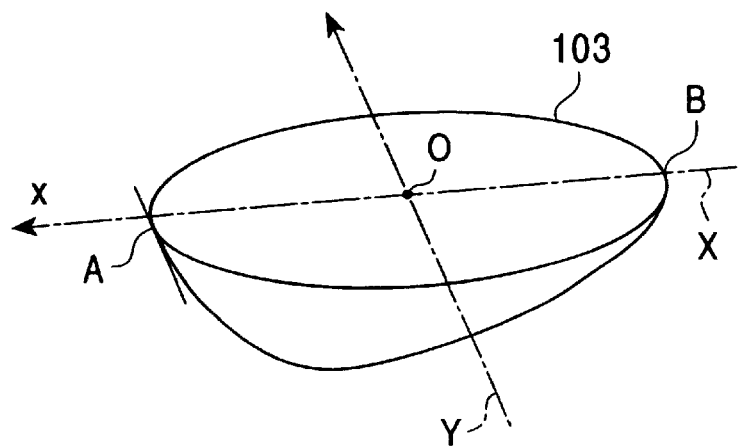
FIG. 12 is a perspective view showing one concavity according to the second embodiment of the present invention.
Figure 13:
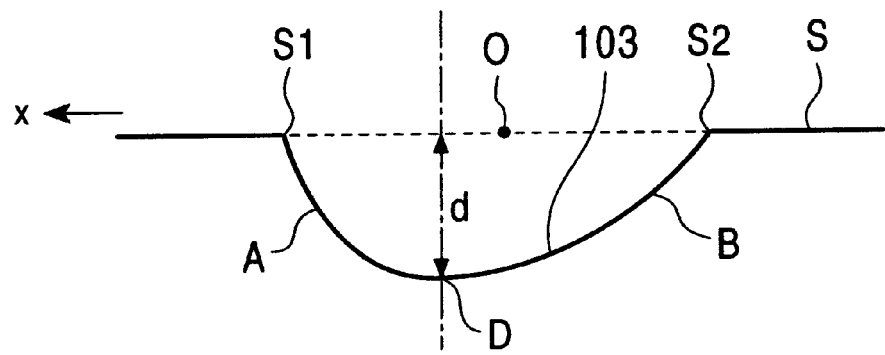
FIG. 13 is a cross-sectional view of the concavity at a first vertical cross-section.
Figure 14:
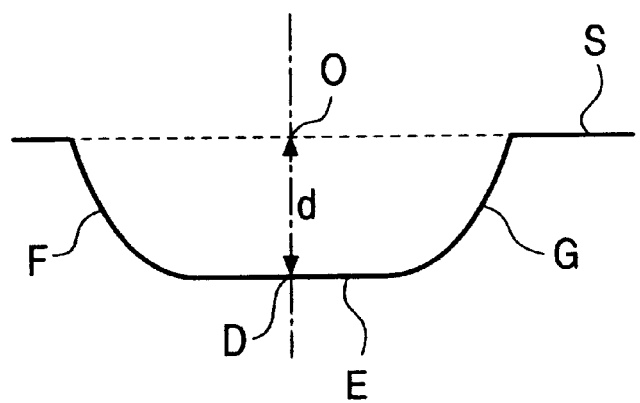
FIG. 14 is a cross-sectional view of the concavity at a second vertical cross-section.

The shape of the inner surface of each concavity 103 is shown in detail in FIGS. 12 to 14. FIG. 12 is a perspective view of the concavity 103, FIG. 13 is a cross-sectional view of the concavity 103 taken through a vertical cross-section X, and FIG. 14 is a cross-sectional view of the concavity 103 taken at a vertical-cross section Y orthogonal to the vertical cross-section X.

As shown in FIG. 13, the shape of the inner surface of the concavity 103 through the vertical cross-section X includes a first curved line A beginning at an edge S1 of the concavity 103 and ending at the deepest point D of the concavity 103, and a second curved line B beginning at the deepest point D and ending at another edge S2 of the concavity 103. In FIG. 13, each of the downward-sloping curved line A and the upward-sloping curved line B forms a tilt angle of zero with respect to the surface S at the deepest point D. The junction between the first curved line A and the second curved line B is smooth.

The tilt angle of the first curved line A with respect to the surface S is sharper than that of the second curved line B. The deepest point D is shifted in the x direction from a center O of the concavity 103. In other words, the average absolute value of the tilt angles of the first curved line A with respect to the surface S is larger than that of the second curved line B. To be more specific, the average absolute values of the tilt angles of the first curved lines A of the concavities 103a, 103b, and 103c vary at random within the range of 2 to 90 degrees, and the average absolute values of the tilt angles of the second curved lines B of the concavities 103a, 103b, and 103c vary at random within the range of 1 to 89°.

On the other hand, as shown in FIG. 14, the shape of the inner surface of the concavity 103 at the vertical cross-ssection Y is substantially symmetrical with respect to the center O of the concavity 103. The radius of curvature is large at the deepest point D and at sections around the deepest point D, thereby giving a substantially straight curved line E. A curved line F having a large radius of curvature extends from the left end of the curved line E, and a curved line G also having a large radius of curvature extends from the right end of the curved line E, as shown in FIG. 14. In each of the concavities 103, the absolute value of the tilt angles of the curved line E with respect to the surface S is approximately 10 degrees or less. The absolute values of the tilt angles of the curved lines F and G with respect to the surface S vary at random in the range of 2 to 90 degrees among the concavities 103, for example.

Moreover the depths d of the concavities 103, i.e., the distances between the deepest point D and the surface S, also vary at random in the range of 0.1 to 3 μm, for example.

In this embodiment, all of the vertical cross-sections X of the concavities 103 are aligned in one direction, and all of the vertical cross-sections Y of the concavities 103 are aligned in one direction. Moreover, all of the first curved lines A of the concavities 103 are aligned in one direction. In other words, the direction x shown in FIGS. 12 and 13 is the same regardless of which one of the concavities 103 is chosen. However, the directions of the vertical cross sections X and Y may vary by approximately 2 to 10 degrees among the concavities 103 as long as no adverse effects are caused.

Figure 15:
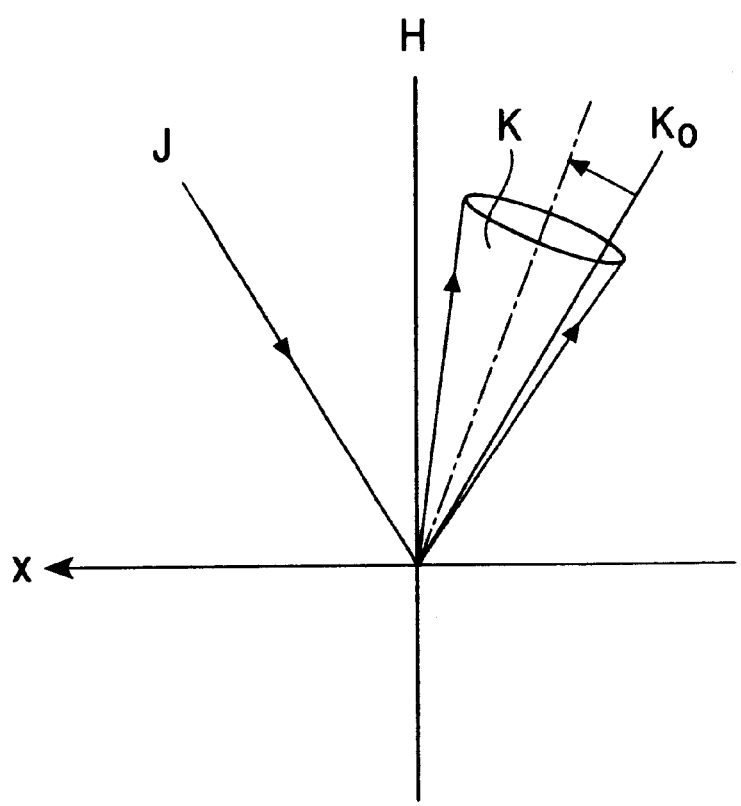
FIG. 15 is a schematic illustration for explaining the reflection characteristic of the reflector of the second embodiment of the present invention.

In the reflector 101 of this embodiment, since the first curved lines A of all of the concavities 103 are aligned in one direction, the reflection ranges thereof are slightly shifted from the direction of the specular reflection with respect to the surface S, as shown in FIG. 15.

In other words, as shown in FIG. 15, while incident light J from the upper left in the drawing is emitted as reflected light K, the bright display range is shifted toward the normal direction H from the direction $K_0$ of the specular reflection.

Moreover, because the curved lines F and G having a small radius of curvature are provided at both sides of the curved line E having a large radius of curvature in the vertical cross-section Y of each concavity 103, the reflectance in the direction of the specular reflection relative to the surface S can be increased.

Figure 16:
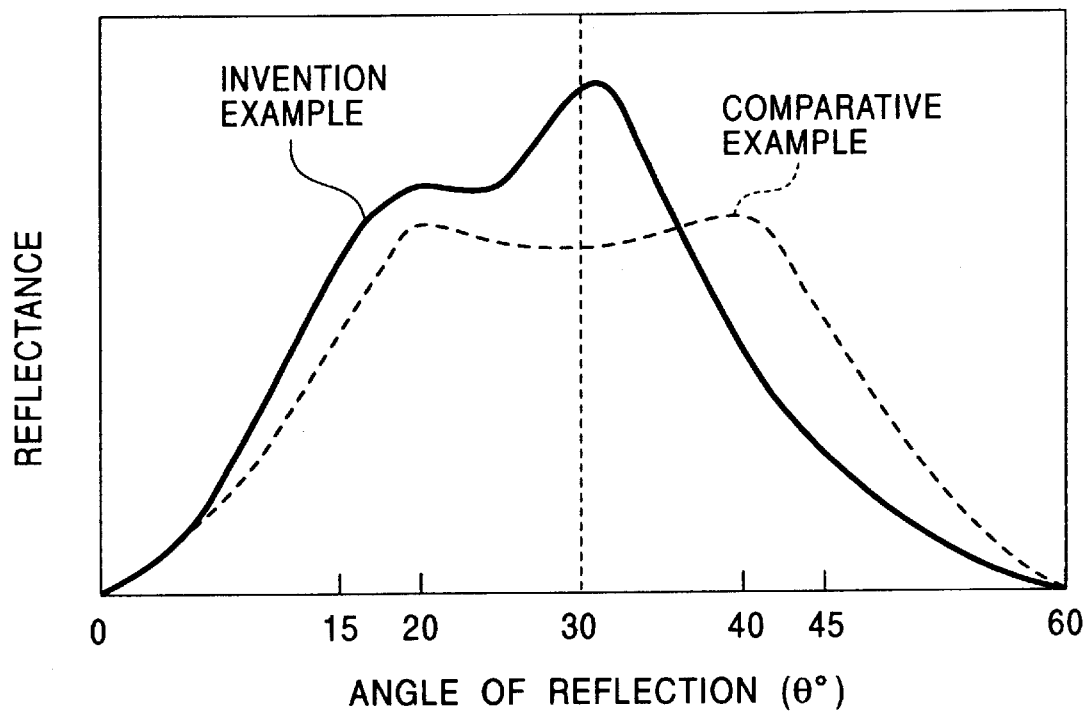
FIG. 16 is a graph showing the relationship between the angle of reflectance (receiving angle) and the reflectance.

As shown in FIG. 16, with this vertical cross-section X (first vertical cross-section), the reflectance peaks at the angle of the specular reflection, i.e., 30 degrees in this case. Moreover, the reflectance in the direction of reflection at the surface around the second curved line B can be increased. In other words, the overall reflection characteristic of the vertical cross-section X is excellent since light can be adequately reflected in a desired direction while sustaining sufficient reflected light in the direction of specular reflection.

FIG. 16 is a graph showing the relationship between the angle of reflection (receiving angle) θ° and the brightness, i.e., the reflectance, when external light is incident on the display face of the liquid crystal cell 1 at an angle of 30°. The receiving angle is varied from the normal line position (0°) to 60° so that the angle of specular reflection, i.e., 30°, comes at the middle. For the purpose of comparison, in FIG. 16, the relationship between the angle of reflection and the reflectance of a conventional reflective liquid crystal display that the present inventors have invented is shown. The conventional reflective liquid crystal display uses a reflector including concavities each having an inner surface that represents part of a spherical surface.

As is apparent from FIG. 16, the comparative example shows substantially the same reflectance over the range of receiving angles of approximately 15 to 45 degrees, and the curve thereof is substantially trapezoidal. In contrast, the liquid crystal display using the reflector of this embodiment has a peak reflectance at 30°, i.e., the angle of specular reflection, and the integrated reflectance at receiving angles of less than 30° is larger than that at receiving angles of more than 30°. In other words, a high brightness can be achieved at a viewing angle of around 20°, i.e., the region closer to the normal line H, while sustaining a high brightness in the direction of specular reflection.

No limit is imposed as to the methods for making the reflector 101 of this embodiment. For example, the reflector 101 can be made as follows.

A stamping member comprising a head having a shape corresponding to the inverted shape of the above-described concavity 103 is prepared. The head of the stamping member is then disposed to oppose an aluminum substrate. While maintaining the stamping member in the same direction relative to the aluminum member, the entire surface of a predetermined region of the aluminum substrate is stamped with a striking force varying at random at various stamping intervals. The striking force is adjusted so that the depth of the concavity is within the predetermined range. The stamping interval is adjusted so as to prevent the generation of a moire pattern.

Figure 17:
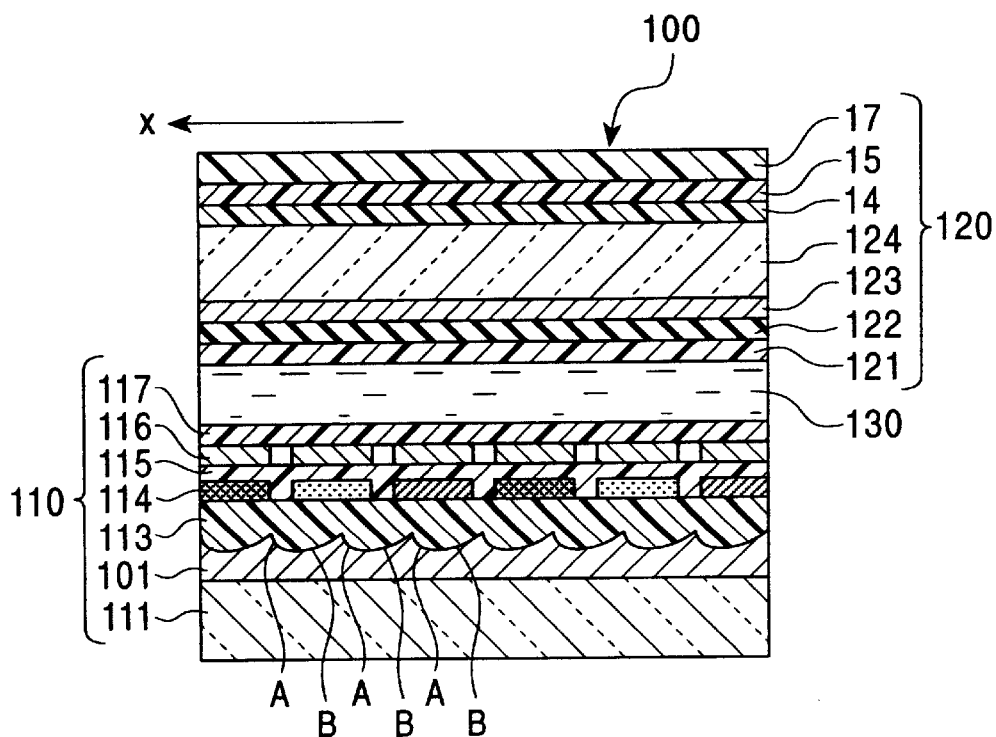
FIG. 17 is a cross-sectional view showing the layer structure of the reflective liquid crystal display of the second embodiment.

FIG. 17 is a cross-sectional view showing the layer structure of a reflective liquid crystal display 100 comprising the reflector 101 of this embodiment.

As shown in FIG. 17, the reflective liquid crystal display 100 includes a liquid crystal layer 130, a transmissive display-side substrate 120, and a reflective reflector-side substrate 110. The display-side substrate 120 opposes the reflector-side substrate 110 with the liquid crystal layer 130 therebetween. The outer surface of the display-side substrate 120 is the display face. The reflector-side substrate 110 includes the reflector 101.

The reflector-side substrate 110 comprises a glass substrate 111, the reflector 101, a transparent intermediate layer 113, a color filter 114, a transparent planarizing layer 115, a transparent electrode layer 116 composed of indium tin oxide (ITO), nesa, or the like, and an alignment layer 117, stacked in that order from the bottom. The display-side substrate 120 comprises an alignment layer 121, an insulating layer 122, a transparent electrode 123 composed of ITO, nesa, or the like, a glass substrate 124, the first retarder 14, the second retarder 15, and the polarizer 17, stacked in that order when viewed from the liquid crystal layer 130. The first retarder 14, the second retarder 15, and the polarizer 17 are the same as those in the first embodiment. In other words, the retardation $\Delta nd_{RF1}$ of the first retarder 14 and the retardation $\Delta nd_{RF2}$ of the second retarder 15 are set as in FIGS. 3 and 4, and the delay axis α of the polarizer 17 is arranged as in the first embodiment. In the second embodiment, the retardation $\Delta nd_{LC}$ of the liquid crystal cell, the rubbing direction, and the twist angle of the liquid crystal are the same as those in the first embodiment.

The transparent electrode layers 116 and 123 are formed into stripes and extend orthogonal to each other. The intersections of the transparent electrode layers 116 and 123 function as pixels of a simple-matrix liquid crystal display.

Figure 18:
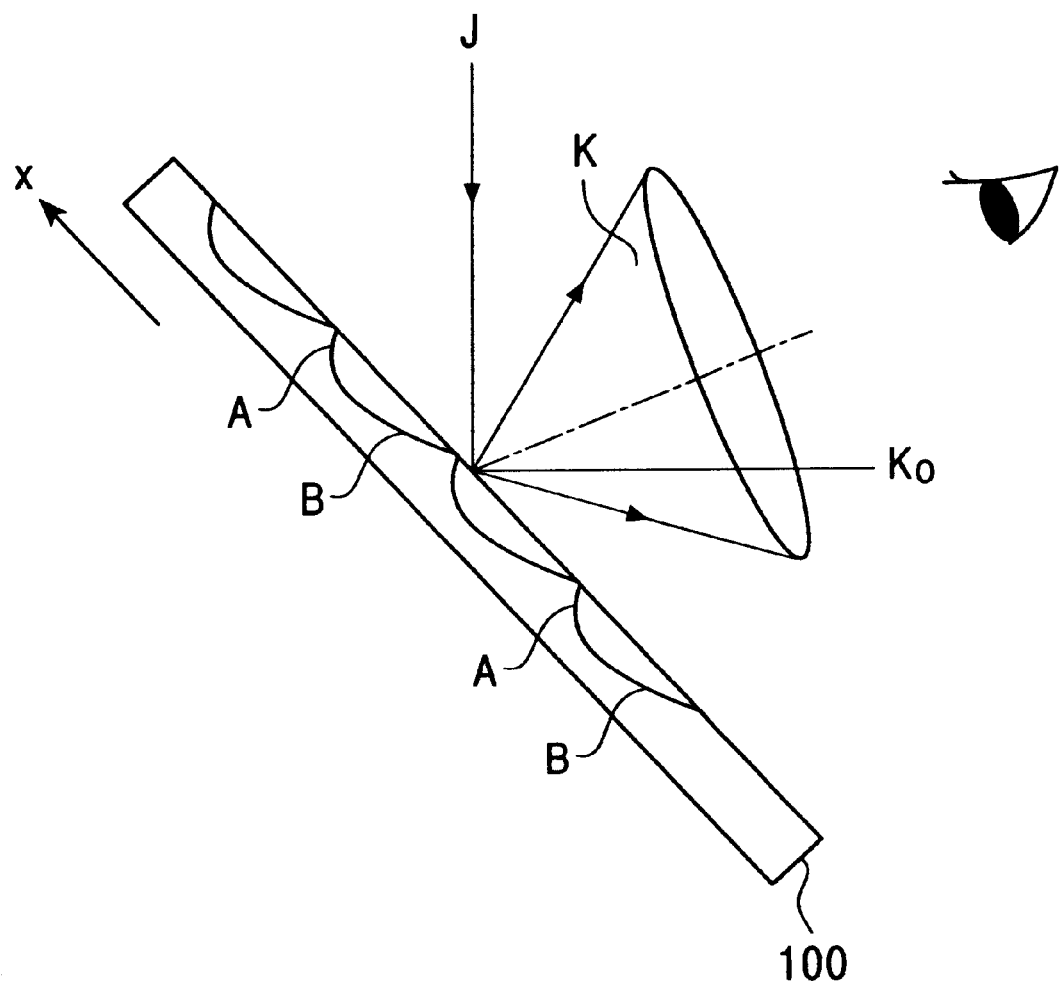
FIG. 18 is a schematic illustration showing the reflective liquid crystal display of the second embodiment in actual operation.

In the reflective liquid crystal display 100 of this embodiment, the reflector 101 is arranged so that the first curved lines A of the concavities 103a, 103b, and 103c are positioned in the x direction in the drawing compared to the gentle second curved lines B, as shown in FIG. 18. In operation, characters and the like are displayed while setting the x direction as the upward direction.

FIG. 18 is an explanatory view showing an actual state of operation of the reflective liquid crystal display 100. In FIG. 18, components other than the first curved lines A and the second curved lines B of the reflective liquid crystal display 100 are omitted from the drawing for the purpose of explanation.

The reflective liquid crystal display 100 is installed in a cellular phone, a notebook computer, or the like so that the x direction is set as the upward direction when viewed by an observer. Generally, when the reflective liquid crystal display 100 is installed in or supported by a device, the reflective liquid crystal display 100 is tilted relative to the horizontal plane. In other words, the first curved line A of each concavity comes above the second curved line B when viewed from the observer. The observer usually looks down on the reflective liquid crystal display 100 from diagonally above.

In this arrangement, most of the external light entering from above the reflective liquid crystal display 100 (incident light J) is reflected at the planes around the second curved lines B. As described above with reference to FIG. 5, light is hardly reflected in the downward direction relative to the observer, but is primarily reflected in the direction above the direction $K_0$ of specular reflection.

Thus, in actual operation, remarkably bright display can be achieved since the viewing range of the observer coincides with the bright display range of the reflective liquid crystal display 100.

Although the reflective liquid crystal display 100 of this embodiment shown in FIG. 17 has the reflector 101 and the transparent electrode layer 116 as separate layers, the transparent electrode layer 116 may be formed of a reflective material and placed at the position of the transparent electrode layer 116 in FIG. 17 to replace the transparent electrode layer 116 so that the transparent electrode also functions as the reflector, thereby simplifying the structure of the reflective liquid crystal display. In this case, since the reflector 101 must conduct electricity, the transparent electrode layer 116 is preferably a thin metal film of a conductive material such as Al or Ag.

Moreover, the reflector 101 may be formed of a half-transmissive, half-reflective member such as half mirror, and an illumination plate maybe placed on the back of the liquid crystal panel. With this arrangement, the liquid crystal display can operate in the reflective mode when enough external light is available and can operate in the transmissive mode by lighting the illumination plate when enough external light is not available. When the transparent electrode layer 116 is used as the reflector 101 as described above, the thickness of the thin metal film is suitably reduced to easily achieve the half-mirror effect. For example, aluminum may be vapor-deposited to a thickness in the range of 50 to 500 Å. Accordingly, the present invention also encompasses a half-transmissive half-reflective liquid crystal display.

Alternatively, a front light may be provided on the display-side substrate 120. With this structure, a front light type reflective liquid crystal display that uses external light when enough external light is available and that uses the front light when enough external light is not available can be obtained. Accordingly, the present invention also encompasses a front-light-type liquid crystal display.

No limit is imposed as to the method for driving the liquid crystal display. The present invention can be applied to the simple matrix type described above, an active matrix type using thin film transistors or thin film diodes, a segmented electrode drive type, and the like.

EXAMPLES

The present invention is described in further detail below using Examples and Comparative Examples. These examples do not limit the scope of the present invention.
Experiment 1

The display characteristics of the reflective liquid crystal display of the first embodiment shown in FIGS. 1 to 5 were examined. The reflective liquid crystal display was of a normally-black type.

In Experiment 1, PSI-2501 (trade name, manufactured by Chisso Corporation) was used as the upper and lower alignment films. The upper and lower alignment films were subjected to orientation so that the twist angle of the liquid crystal was 240°. The alignment direction a of the upper alignment film was +330 (−30) with respect to the bisecting direction X described above. The alignment direction b of the lower alignment film was +30 with respect to the bisecting direction X. As the liquid crystal of the liquid crystal layer, AP-4365LF (trade name, manufactured by Chisso Sekiyu Kagaku Kabushiki Kaisha) was used. As the first retarder, NRZ-170 (trade name, manufactured by Nitto Denko Corp., made of polycarbonate) was used. As the second retarder, NRZ-450.(trade name, manufactured by Nitto Denko Corp., made of polycarbonate) was used. As the polarizer, NPF-SEG1425DU (trade name, manufactured by Nitto Denko Corp.) was used.

The reflector was prepared by forming irregularities in the surface of an acrylic photocurable resin substrate using a silicon mold, curing the acrylic photocurable resin substrate with UV light, and forming an aluminum thin film (metal reflection layer) having a thickness of approximately 150 nm on the irregular surface of the cured resin substrate. The irregular surface of the reflector had many grooves having the same radius of curvature R at curved-face cross-sections thereof and extending in the same direction, as shown in FIG. 5. The widths of the grooves were varied at random so as not to generate any interference pattern due to the light reflected at these grooves.

The retardation $\Delta nd_{Lc}$ (measuring wavelength: 589 nm) of the liquid crystal cell, the retardation $\Delta nd_{RF1}$ of the first retarder, the angle $\phi_{RF1}$ between the delay axis β of the first retarder and the bisecting direction X, the retardation $\Delta nd_{RF2}$ of the second retarder, the angle $\phi_{RF2}$ between the delay axis γ of the second retarder and the bisecting direction X, and the angle $\phi_{pol}$ between the absorption axis α of the polarizer and the bisecting direction X were set as in Table 1 (Samples 1 to 17).

The display characteristics of Samples 1 to 17 were examined as follows. A light source, the polarizer, the second retarder, the first retarder, the liquid crystal cell, and the reflector were aligned in that order. Light entered the liquid crystal cell at an azimuth angle of 90 degrees counterclockwise relative to the liquid crystal cell and at an incident angle of −30 degrees with respect to the Z direction (the normal line direction) shown in FIG. 3. The light reflected in the Z direction was received at a receiving angle of 0°, and the Y-value (brightness) and the contrast during white display (applied voltage: 2.20 V) of the normally-black (N/B) display mode were examined. The brightness was assumed to be satisfactory when the Y-value was higher than 40. The contrast was assumed to be satisfactory when the contrast was higher than 50. The results are shown in Tables 1 and 2.

TABLE 1

| Sample No. | Liquid crystal layer $\Delta nd_{LC}$ (nm) | First retarder $\Delta nd_{RF1}$ (nm) | First retarder $\phi_{RF1}$ (°) | Second retarder $\Delta nd_{RF2}$ (nm) | Second retarder $\phi_{RF2}$ (°) | Polarizer $\phi_{pol}$ (°) | Y | Contrast |
|---|---|---|---|---|---|---|---|---|
| 1 | 630 | 175 | 80.0 | 330 | 122.0 | 62.0 | 40.71 | 77.2 |
| 2 | 650 | 175 | 80.0 | 330 | 122.0 | 62.0 | 43.03 | 219.8 |

TABLE 1-continued

| Sample No. | Liquid crystal layer $\Delta nd_{LC}$ (nm) | First retarder $\Delta nd_{RF1}$ (nm) | First retarder $\phi_{RF1}$ (°) | Second retarder $\Delta nd_{RF2}$ (nm) | Second retarder $\phi_{RF2}$ (°) | Polarizer $\phi_{pol}$ (°) | Y | Contrast |
|---|---|---|---|---|---|---|---|---|
| 3 | 670 | 175 | 80.0 | 340 | 120.0 | 54.0 | 44.71 | 53.2 |
| 4 | 700 | 131 | 68.0 | 377 | 99.0 | 24.5 | 43.78 | 93.5 |
| 5 | 720 | 140 | 70.0 | 410 | 100.0 | 25.0 | 46.44 | 111.3 |
| 6 | 720 | 160 | 80.0 | 370 | 114.0 | 40.0 | 47.31 | 51.0 |
| 7 | 720 | 180 | 90.0 | 330 | 130.0 | 65.0 | 47.17 | 59.2 |
| 8 | 740 | 170 | 85.0 | 370 | 124.0 | 53.0 | 46.66 | 57.3 |
| 9 | 760 | 170 | 75.0 | 450 | 105.0 | 34.0 | 47.10 | 64.4 |
| 10 | 780 | 170 | 75.0 | 450 | 105.0 | 34.0 | 44.07 | 86.6 |

TABLE 2

| Sample No. | Liquid crystal layer $\Delta nd_{LC}$ (nm) | First retarder $\Delta nd_{RF1}$ (nm) | First retarder $\phi_{RF1}$ (°) | Second retarder $\Delta nd_{RF2}$ (nm) | Second retarder $\phi_{RF2}$ (°) | Polarizer $\phi_{pol}$ (°) | Y | Contrast |
|---|---|---|---|---|---|---|---|---|
| 11 | 580 | 175 | 80.0 | 330 | 122.0 | 62.0 | 41.2 | 8.3 |
| 12 | 630 | 210 | 80.0 | 330 | 122.0 | 62.0 | 38.4 | 9.1 |
| 13 | 630 | 175 | 55.0 | 330 | 122.0 | 62.0 | 46.3 | 1.8 |
| 14 | 630 | 175 | 80.0 | 290 | 122.0 | 62.0 | 31.0 | 32.4 |
| 15 | 630 | 157 | 80.0 | 330 | 145.0 | 62.0 | 43.5 | 1.2 |
| 16 | 630 | 175 | 80.0 | 330 | 122.0 | 15.0 | 47.4 | 1.6 |
| 17 | 630 | 175 | 80.0 | 330 | 122.0 | 75.0 | 44.2 | 5.5 |

Tables 1 and 2 demonstrate that Samples 11 to 17, in which one of the retardation $\Delta nd_{LC}$ of the liquid crystal cell, the retardation $\Delta nd_{RF1}$ of the first retarder, the angle $\phi_{RF1}$ between the delay axis β of the first retarder and the bisecting direction X, the retardation $\Delta nd_{RF2}$ of the second retarder, the angle $\phi_{RF2}$ between the delay axis γ of the second retarder and the bisecting direction X, and the angle $\phi_{pol}$ between the absorption axis α of the polarizer and the bisecting direction X was outside the preferable range of the present invention, exhibited a contrast of less than 33. Some of Samples 11 to 17 exhibited Y-values of less than 39.

In contrast, each of Samples 1 to 10 that had all of the retardation $\Delta nd_{LC}$ of the liquid crystal cell, the retardation $\Delta nd_{RF1}$ of the first retarder, the angle $\phi_{RF1}$ between the delay axis β of the first retarder and the bisecting direction X, the retardation $\Delta nd_{RF2}$ of the second retarder, the angle $\phi_{RF2}$ between the delay axis γ of the second retarder and the bisecting direction X, and the angle $\phi_{pol}$ between the absorption axis α of the polarizer and the bisecting direction X adjusted within the preferable ranges of the present invention exhibited a high contrast greater than 51 and a Y-value exceeding 40, thus exhibiting superior display characteristics. In particular, Samples 2 and 5 achieved a bright white display and a remarkably high contrast exceeding 110. In these liquid crystal displays, the background appeared as white as a sheet of white paper, whereas the background appeared light green or slightly creamy in conventional liquid crystal displays when these displays were visually examined.

Experiment 2

The display characteristics of the reflective liquid crystal display of Sample 4 above were examined.

The reflectance and the contrast of Sample 4 were examined as follows. Light from a light source (22 mm in diameter, a luminous flux of 500 lux) entered the liquid crystal cell at an azimuth angle of 330 degrees and at an incident angle of 15 degrees with respect to the Z direction shown in FIG. 3. The Z direction is the direction perpendicular to the incident surfaces of the liquid crystal cell, the first retarder, the second retarder, and the polarizer. The results are shown in FIGS. 7 and 8.

Figure 7:
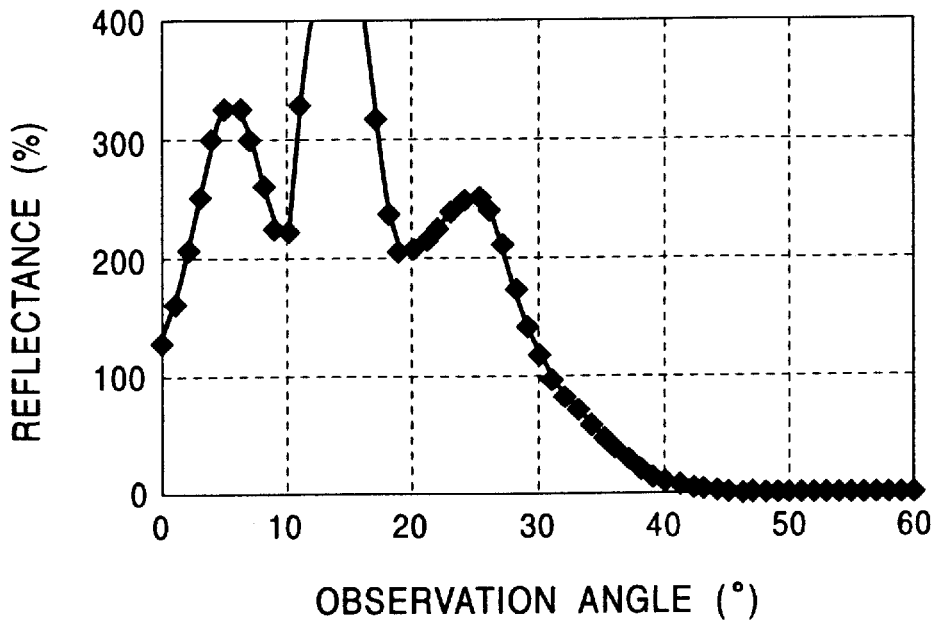
FIG. 7 is a graph showing the reflectance of an example of the liquid crystal display of the present invention when light was incident on the display at an angle of 15 degrees.
Figure 8:
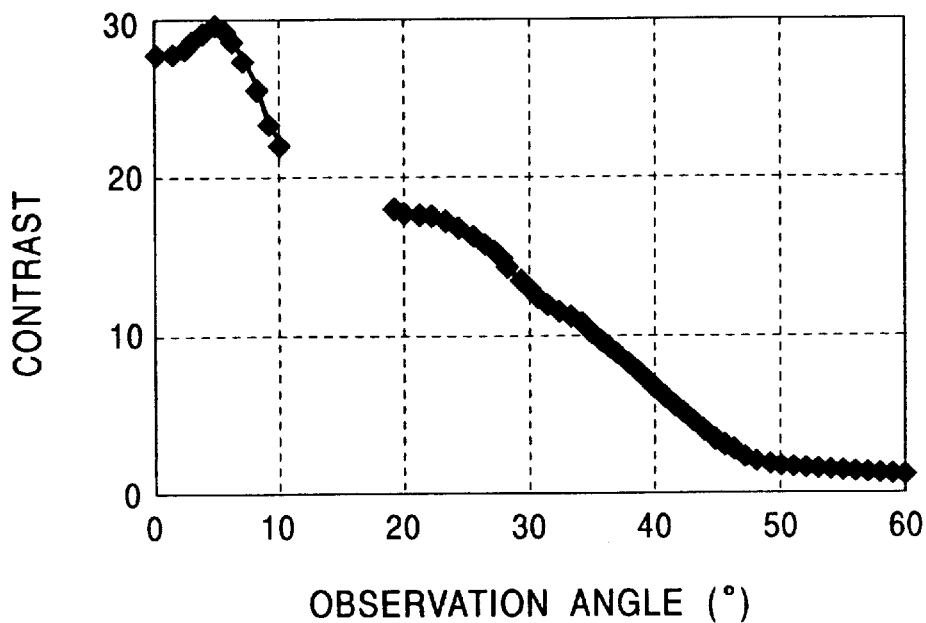
FIG. 8 is a graph showing the contrast of the example of the liquid crystal display of the present invention when light was incident on the display at an angle of 15 degrees.

FIG. 7 is a graph showing the relationship between the observation angle (the receiving angle) and the reflectance, and FIG. 8 is a graph showing the relationship between the observation angle (receiving angle) and the contrast of the reflective liquid crystal display of Sample 4 when light was incident on the liquid crystal cell at an angle of 15 degrees.

Figure 19:
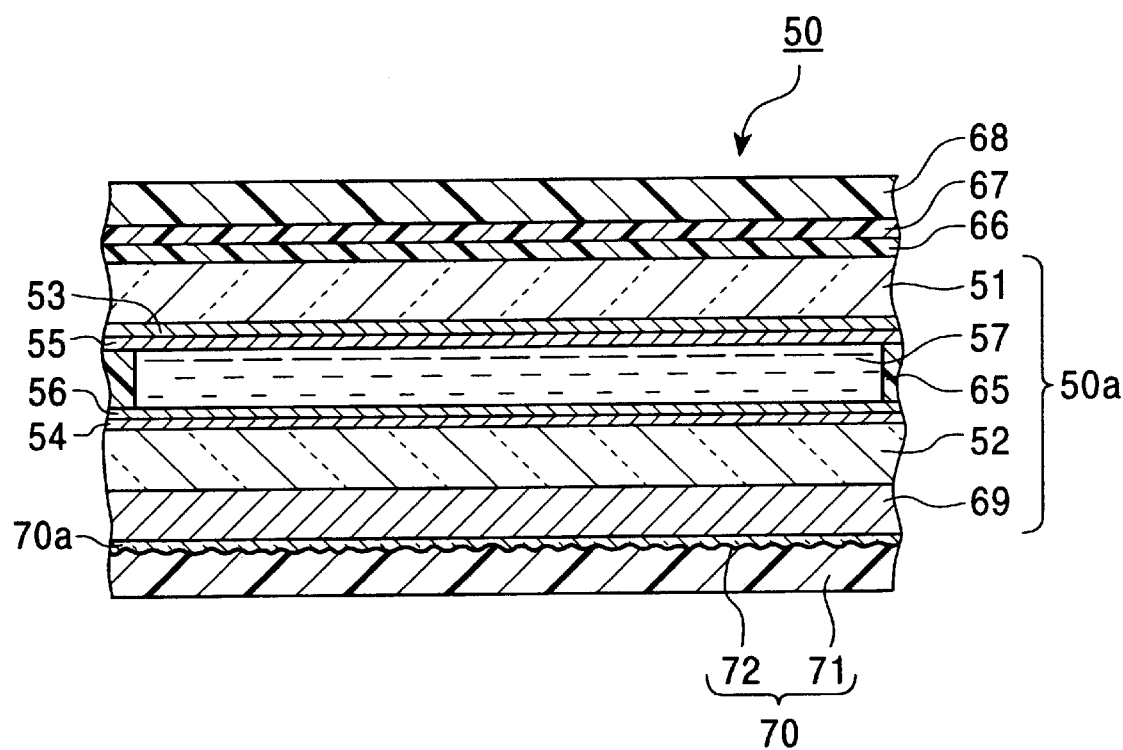
FIG. 19 is a cross-sectional view showing the overall structure of a conventional reflective liquid crystal display.
Figure 20:
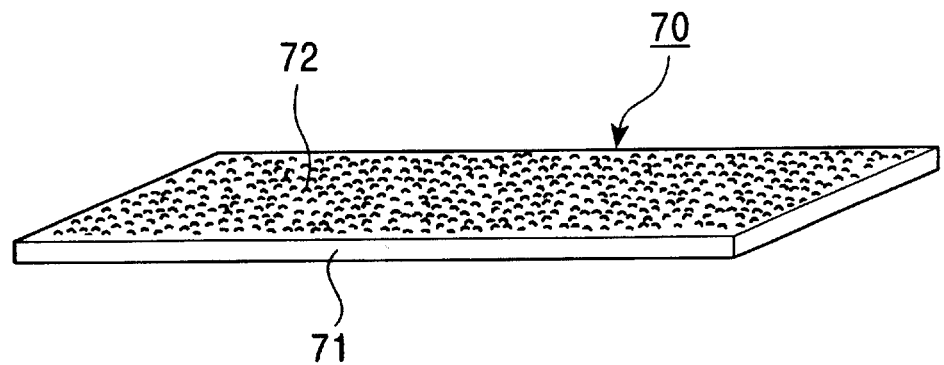
FIG. 20 is a perspective view showing an example of a reflector used in a conventional reflective liquid crystal display.
Figure 21:
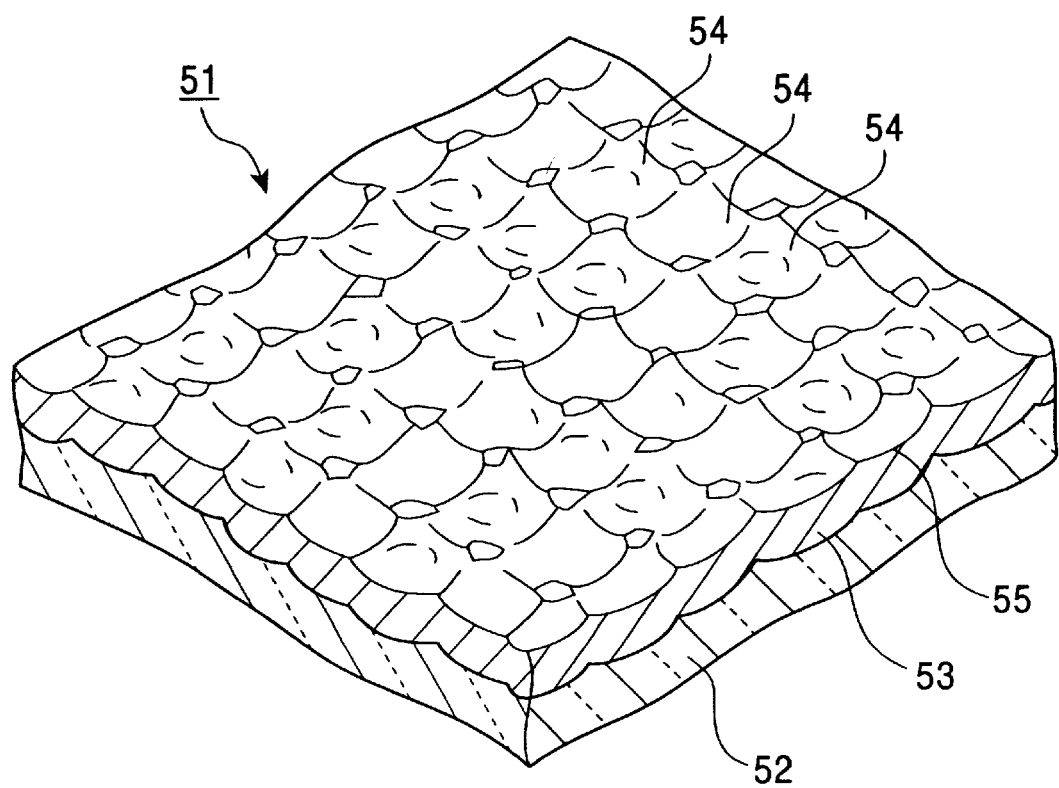
FIG. 21 is a perspective view showing an embodiment of a reflector studied by the present inventors.
Figure 22:
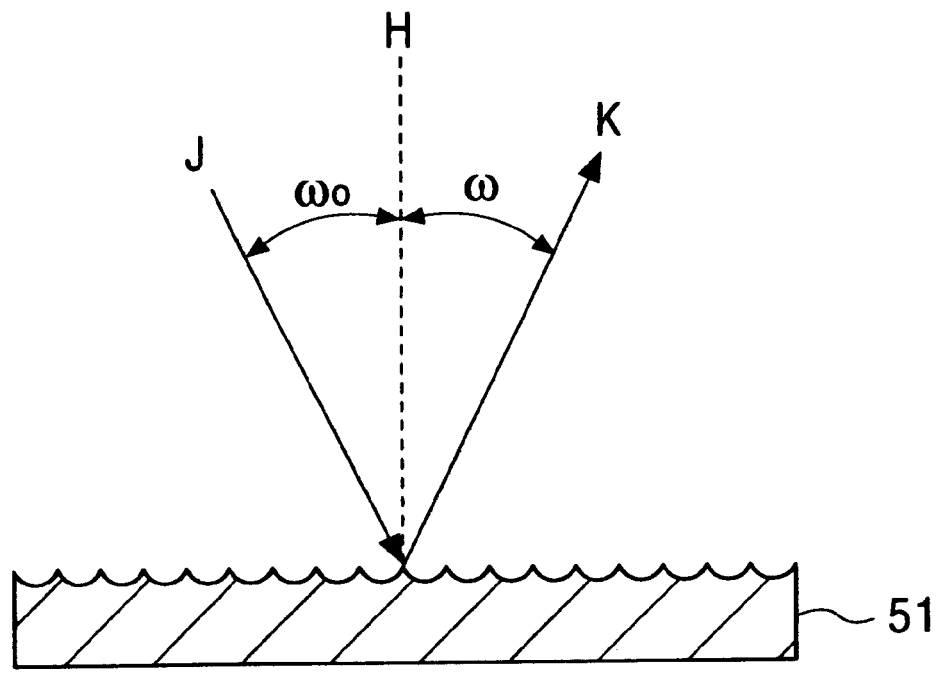
FIG. 22 is a schematic illustration for explaining an angle of incident and an angle of reflectance of light.

As a comparative example, the display characteristics of the conventional reflective liquid crystal display shown in FIGS. 19 and 20 were examined.

In the reflective liquid crystal display of the comparative example, AP-4268LA (trade name, manufactured by Chisso Corporation) was used as the liquid crystal. The liquid crystal had a Δnd, i.e., the product of the birefringence Δn and the thickness d of the liquid crystal layer, of 860 nm (measuring wavelength: 589 nm). As the first and second retarder, NRF-430 (trade name, manufactured by Nitto Denko Corp., made of polycarbonate) was used. As the upper polarizer (first polarizer) and the lower polarizer (second polarizer), NPF-EG-1225DU (trade name, manufactured by Nitto Denko Corporation) was used. The reflector was prepared by forming irregularities on the surface of a resin film by sand-blasting to form an irregular surface, and vapor-depositing an aluminum layer having a thickness of approximately 26 to 28 nm (the total light transmission (T) of the Al layer=10%) on the irregular surface. Other materials used in the comparative example were same as those used in examples of the present invention.

In the reflective liquid crystal display of the comparative example, Δnd of the liquid crystal cell was 860 nm, the retardation of the first retarder was 430 nm, the angle defined by the delay axis of the first retarder and the bisecting direction X was 70 degrees counterclockwise when viewed from the direction perpendicular to the surface of the first retarder, the retardation of the second retarder was 430 nm, the angle between the delay axis of the second retarder and the bisecting direction X was 25 degrees counterclockwise, the angle between the absorption axis of the first polarizer (upper polarizer) and the bisecting direction X was 5 degrees counterclockwise when viewed from the direction perpendicular to the surface of the first polarizer, and the angle between the absorption axis of the second polarizer (lower polarizer) and the bisecting direction X was 5 degrees counterclockwise.

The relationship between the observation angle (receiving angle) and the reflectance and the relationship between the observation angle and the contrast at an incident angle of 15 degrees were examined as with Sample 4. The results are shown in FIGS. 9 to 10.

Figure 9:
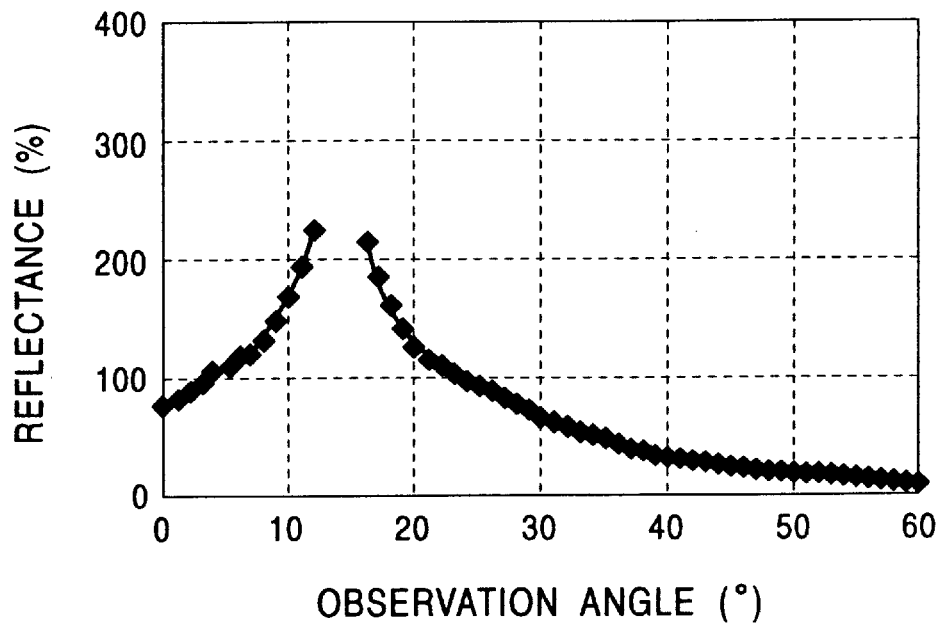
FIG. 9 is a graph showing the reflectance of a comparative example of a liquid crystal display when light was incident on the display at an angle of 15 degrees.
Figure 10:
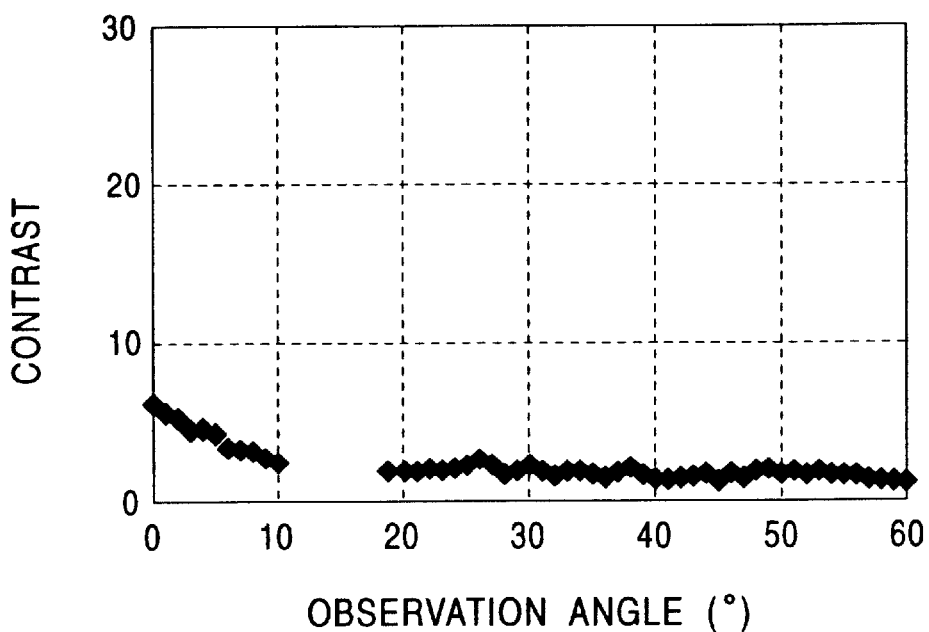
FIG. 10 is a graph showing the contrast of a comparative example of the liquid crystal display when light was incident on the display at an angle of 15 degrees.

FIG. 9 is a graph showing the relationship between the observation angle (the receiving angle) and the reflectance, and FIG. 10 is a graph showing the relationship between the observation angle (receiving angle) and the contrast of the reflective liquid crystal display of the comparative example when light was incident on the liquid crystal display at an angle of 15 degrees.

FIGS. 7 and 9 demonstrate that the reflective liquid crystal display of Sample 4 had a high-reflectance range larger than that of the comparative example during bright display. The reflective liquid crystal display of Sample 4 exhibited a distinctively high reflectance over the observation-angle ranges of 0 to 12° and 16 to 34° compared to the reflective liquid crystal display of the comparative example.

FIGS. 8 and 10 demonstrate that the reflective liquid crystal display of Sample 4 had a high-contrast range larger than that of the comparative example. The reflective liquid crystal display of Sample 4 exhibited a distinctively high contrast over the observation-angle ranges of 0 to 10° and 18 to 46° compared to the reflective liquid crystal display of the comparative example. These results show that the viewing angle of the display can be improved by using the reflective liquid crystal display of Sample 4.

What is claimed is:

1. A liquid crystal display comprising:
    a liquid crystal cell comprising,
    a first transparent substrate,
    a second transparent substrate opposing the first transparent substrate and being at a light-incident side,
    a liquid crystal layer disposed between the first transparent substrate and the second transparent substrate,
    a first transparent electrode formed on an inner surface of the first transparent substrate, the inner surface opposing the second transparent substrate,
    a first alignment film formed on the first transparent electrode,
    a second transparent electrode formed on an inner surface of the second transparent substrate, the inner surface opposing the first transparent substrate, and
    a second alignment film formed on the second transparent electrode;
    a reflector attached on an outer surface of the first transparent substrate with a bonding layer therebetween;
    a first retarder disposed on an outer surface of the second transparent substrate;
    a second retarder disposed on the first retarder; and
    a polarizer disposed on the second retarder;
    wherein the reflector comprises a resin substrate having an irregular surface and a metal reflection film disposed on the irregular surface of the resin substrate, the surface of the metal reflection film also being irregular due to the irregular surface of the resin substrate, and the reflector is arranged so that the metal reflection film opposes the first transparent substrate,
    wherein the reflector further comprises a plurality of concavities that reflect light formed in the surface of the reflector, each of the plurality of concavities having a first vertical cross-section and a second vertical cross-section that pass through the deepest point of the concavity,
    wherein the first vertical cross-section, showing a shape of the inner surface of the concavity, has a first curved line from an edge of the concavity to the deepest point and a second curved line from the deepest point of the concavity to another edge of the concavity, and an average absolute value of tilt angles of the first curved line with respect to the surface of the reflector is larger than that of the second curved line, and
    wherein the second vertical cross-section is orthogonal to the first vertical cross-section, shows another shape of the inner surface of the concavity, and has a gentle curved line and two sharp curved lines extending from the two ends of the gentle curved line, the two sharp curved lines having a radius of curvature smaller than that of the gentle curved line.

2. The liquid crystal display according to claim 1, further comprising a color filter disposed between the first transparent substrate and the first transparent electrode.

3. The liquid crystal display according to claim 1, wherein,
    the liquid crystal layer has a helical structure twisted through 240 to 250 degrees along the thickness direction of the liquid crystal layer, and a retardation $\Delta nd_{LC}$ of the liquid crystal cell is in the range of 600 to 800 nm,
    a retardation $\Delta nd_{RF1}$ of the first retarder is in the range of 100 to 200 nm, and an angle $\phi_{RF1}$ between a delay axis β of the first retarder and a bisecting direction X is in the range of 60 to 100 degrees counterclockwise when viewed in the direction perpendicular to the surface of the second transparent substrate from the light-incident side,
    a retardation $\Delta nd_{RF2}$ of the second retarder is in the range of 300 to 500 nm, and an angle $\phi_{RF2}$ between a delay axis γ of the second retarder and the bisecting direction X is in the range of 90 to 140 degrees counterclockwise when viewed in the direction perpendicular to the surface of the second transparent substrate from the light-incident side, and
    an absorption axis α of the polarizer is arranged so that an angle $\phi_{pol}$ between the absorption axis α and the bisecting direction X is in the range of 20 to 70 degrees or 110 to 160 degrees counterclockwise,
    wherein the bisecting direction X is the direction of an axis that passes through the intersection O of an alignment direction a of the second alignment film and an alignment direction b of the first alignment film when viewed in the direction perpendicular to the surface of the second transparent substrate from the light-incident side, and that bisects the inner angle between the alignment direction a and the alignment direction b.

4. The liquid crystal display according to claim 1, wherein,
    the liquid crystal layer has a helical structure twisted through 240 degrees along the thickness direction of the liquid crystal layer, and a retardation $\Delta nd_{LC}$ of the liquid crystal cell is in 700 nm,
    a retardation $\Delta nd_{RF1}$ of the first retarder is 169 nm, and an angle $\phi_{RF1}$ between a delay axis β of the first retarder and a bisecting direction X is 82 degrees counterclockwise when viewed in the direction perpendicular to the surface of the second transparent substrate from the light-incident side,
    a retardation $\Delta nd_{RF2}$ of the second retarder is 425 nm, and an angle $\phi_{RF2}$ between a delay axis γ of the second retarder and the bisecting direction X is 113 degrees counterclockwise when viewed in the direction perpendicular to the surface of the first transparent substrate, and
    an absorption axis α of the polarizer is arranged so that an angle $\phi_{pol}$ between the absorption axis α and the bisecting direction X is 42.5 degrees counterclockwise,
    wherein the bisecting direction X is the direction of an axis that passes through an intersection O of an alignment direction a of the second alignment film and an alignment direction b of the first alignment film when viewed in the direction perpendicular to the surface of the second transparent substrate from the light-incident side, and that bisects the inner angle between the alignment direction a and the alignment direction b.

5. The liquid crystal display according to claim 1, wherein the first retarder has an $N_Z$ coefficient in the range of −0.5 to 2.0, and the second retarder has an $N_Z$ coefficient in the range of −0.5 to 2.0, the $N_Z$ coefficients being determined by:

$$N_Z=(n_x-n_y)/(n_x-n_y)$$

wherein $n_x$ is the refractive index of the retarders in the X axis direction, $n_y$ is the refractive index of the retarders in the Y axis direction, and $n_y$ is the refractive index of the retarders in the Z axis direction.

6. The liquid crystal display according to claim 1, wherein the first retarder has an $N_Z$ coefficient of 0.5 and the second retarder has an $N_Z$ coefficient of 0.3, the $N_Z$ coefficients being determined by:

$$N_Z=(n_x-n_y)/(n_x-n_y)$$

wherein $n_x$ is the refractive index of the retarders in the X axis direction, $n_y$ is the refractive index of the retarders in the Y axis direction, and $n_y$ is the refractive index of the retarders in the Z axis direction.

7. The liquid crystal display according to claim 1, wherein the plurality of concavities have the first vertical cross-sections aligned in one direction and the second vertical cross-sections aligned in another direction, and the first curved lines of the plurality of concavities are aligned in said one direction.

8. The liquid crystal display according to claim 1, wherein, in each of the plurality of concavities, tilt angles of the first curved line and the second curved line relative to the surface of the reflector are zero in the region of the inner surface of the concavity where the first curved line meets the second curved line.

9. The liquid crystal display according to claim 1, wherein the depth of the plurality of concavities varies at random within the range of 0.1 to 3 µm.

10. The liquid crystal display according to claim 1, wherein the plurality of concavities are arranged at random to be adjacent with one another.

11. The liquid crystal display according to claim 1, wherein the plurality of concavities have the first vertical cross-sections aligned in one direction and the second vertical cross-sections aligned in another direction, the first curved lines of the plurality of concavities are aligned in said one direction, and the reflector is disposed so that, in each of the plurality of concavities, the first curved line is arranged above the second curved line when viewed from an observer.

12. The liquid crystal display according to claim 1, wherein the reflectance of the reflector has a peak at a specular reflection angle, and an integrated reflectance over reflection angles smaller than the specular reflection angle is different from that over reflection angles larger than the specular reflection angle.

13. The liquid crystal display according to claim 12, wherein the reflection angles that exhibit a higher integrated reflectance are smaller than the specular reflection angle.

14. A liquid crystal display comprising:

a liquid crystal cell comprising, a first transparent substrate, a second transparent substrate opposing the first transparent substrate and being at a light-incident side, a liquid crystal layer disposed between the first transparent substrate and the second transparent substrate, a first transparent electrode formed on an inner surface of the first transparent substrate, the inner surface opposing the second transparent substrate, a first alignment film formed on the first transparent electrode, a second transparent electrode formed on an inner surface of the second transparent substrate, the inner surface opposing the first transparent substrate, and a second alignment film formed on the second transparent electrode;

a reflector attached on an outer surface of the first transparent substrate with a bonding layer therebetween;

a first retarder disposed on an outer surface of the second transparent substrate;

a second retarder disposed on the first retarder; and a polarizer disposed on the second retarder;

wherein the reflector comprises a resin substrate having an irregular surface with a plurality of concavities and a metal reflection film disposed on the irregular surface of the resin substrate, the surface of the metal reflection film also being irregular due to the irregular surface of the resin substrate, the reflector is arranged so that the metal reflection film opposes the first transparent substrate, and a reflectance of the reflector has a peak at about a specular reflection angle, and an integrated reflectance over reflection angles smaller than the specular reflection angle is greater than that over reflection angles larger than the specular reflection angle for the same ranges of reflection angles.

15. The liquid crystal display according to claim 14, wherein the reflectance at the specular reflection angle is larger than the reflectance at any other angle.

16. The liquid crystal display according to claim 14 wherein the reflectance exhibits at least one peak at an angle smaller than the specular reflection angle.

17. The liquid crystal display according to claim 16 wherein the reflectance at the at least one peak is at least about one half of the reflectance at the specular reflection angle.

18. The liquid crystal display according to claim 16 wherein a FWHM (full width half maximum) of the at least one peak is at least a few degrees.

19. The liquid crystal display according to claim 14 wherein the reflectance exhibits at least one peak at an angle greater than the specular reflection angle.

20. The liquid crystal display according to claim 19 wherein the reflectance at the at least one peak is at least about one half of the reflectance at the specular reflection angle.

21. The liquid crystal display according to claim 19, wherein a FWHM (full width half maximum) of the at least one peak is at least a few degrees.

22. The liquid crystal display according to claim 16, wherein the reflectance exhibits at least a first peak at an angle less than the specular reflection angle and at least a second peak at an angle greater than the specular reflection angle.

23. The liquid crystal display according to claim 22, wherein the first peak is larger than the second peak.

24. The liquid crystal display according to claim 22, wherein the reflectance at each of the first and second peaks is at least about one half of the reflectance at the specular reflection angle.

25. The liquid crystal display according to claim 22 wherein a FWHM (full width half maximum) of each of the first and second peaks is at least a few degrees.

26. The liquid crystal display according to claim 16, wherein the integrated reflectance over the reflection angles smaller than the specular reflection angle is greater than that over the reflection angles larger than the specular reflection angle.

27. The liquid crystal display according to claim 16, wherein an integrated contrast over reflection angles smaller than the specular reflection angle is greater than that over reflection angles larger than the specular reflection angle for the same ranges.

28. The liquid crystal display according to claim 16, wherein a contrast of the reflector exhibits a first peak at the specular reflection angle and a second peak at an angle smaller than the specular reflection angle.

* * * * *